US007580130B2

(12) United States Patent
Shannon et al.

(10) Patent No.: US 7,580,130 B2
(45) Date of Patent: *Aug. 25, 2009

(54) METHOD FOR DESIGNING A COLORIMETER HAVING INTEGRAL ILLUMINANT-WEIGHTED CIE COLOR-MATCHING FILTERS

(75) Inventors: Colman Shannon, Lawrenceville, NJ (US); David Slocum, Yardley, PA (US); Michael Vhrel, Sammamish, WA (US)

(73) Assignee: Datacolor Holding AG, Lucerne (CH)

( * ) Notice: Subject to any disclaimer, the term of this patent is extended or adjusted under 35 U.S.C. 154(b) by 503 days.

This patent is subject to a terminal disclaimer.

(21) Appl. No.: 11/387,294

(22) Filed: Mar. 23, 2006

(65) Prior Publication Data

US 2006/0215193 A1 Sep. 28, 2006

Related U.S. Application Data

(63) Continuation-in-part of application No. 11/281,766, filed on Nov. 16, 2005, now Pat. No. 7,420,680.

(60) Provisional application No. 60/664,117, filed on Mar. 23, 2005.

(51) Int. Cl.
*G01N 21/25* (2006.01)

(52) U.S. Cl. ....................................... 356/419; 356/416

(58) Field of Classification Search ................. 356/416, 356/418, 419
See application file for complete search history.

(56) References Cited

U.S. PATENT DOCUMENTS 4,150,898 A 4/1979 Suga
4,547,074 A 10/1985 Hinoda et al.
4,764,670 A 8/1988 Pace et al.
4,830,501 A 5/1989 Terashita
4,876,167 A 10/1989 Snow et al.
4,923,860 A 5/1990 Simons
4,965,242 A 10/1990 De Boer
5,144,498 A 9/1992 Vincent
5,166,126 A 11/1992 Harrison et al.
5,168,320 A 12/1992 Lutz et al.
5,272,518 A 12/1993 Vincent
5,419,990 A 5/1995 Wake et al.
5,521,035 A 5/1996 Wolk et al.
5,599,766 A 2/1997 Boroson et al.
5,631,703 A 5/1997 Hamilton et al.
5,671,059 A 9/1997 Vincent
5,691,817 A 11/1997 Cargill et al.
5,719,074 A 2/1998 Hawkins et al.
5,726,805 A 3/1998 Kaushik et al.
5,729,360 A * 3/1998 Kita et al. .................. 358/500
5,871,871 A 2/1999 Hogan et al.
5,892,585 A 4/1999 Lianza et al.

(Continued)

OTHER PUBLICATIONS

Richard F. Lyon and Paul M. Hubel, "Eyeing the Camera: into the Next Century," Imaging Science & Technology, Society for Info. Display, Color Imagery Conference, Nov. 2002, Scottsdale, AZ.

(Continued)

*Primary Examiner*—Roy Punnoose

(57) ABSTRACT

A method for determining the optimal colorant thicknesses and linear combinations for integral illuminant-weighted CIE color-matching filters is provided. A reflectance colorimeter for configuring printers may be designed using this method.

23 Claims, 27 Drawing Sheets

U.S. PATENT DOCUMENTS

| | | | | |
|---|---|---|---|---|
| 5,926,282 | A | 7/1999 | Knobloch et al. | |
| 5,929,432 | A | 7/1999 | Yamakawa | |
| 6,083,649 | A | 7/2000 | Takeshita et al. | |
| 6,111,300 | A | 8/2000 | Cao et al. | |
| 6,163,377 | A | 12/2000 | Boles et al. | |
| 6,252,663 | B1 | 6/2001 | Cooper | |
| 6,330,029 | B1 | 12/2001 | Hamilton et al. | |
| 6,362,513 | B2 | 3/2002 | Wester | |
| 6,365,304 | B2 | 4/2002 | Simons | |
| 6,566,723 | B1 | 5/2003 | Vook et al. | |
| 6,604,466 | B2 | 8/2003 | Komori et al. | |
| 6,628,331 | B1 | 9/2003 | Bean | |
| 6,760,475 | B1 | 7/2004 | Miller | |
| 6,771,314 | B1 | 8/2004 | Bawolek et al. | |
| 6,774,988 | B2 | 8/2004 | Stam et al. | |
| 6,804,006 | B2 | 10/2004 | Griffus et al. | |
| 6,816,262 | B1 | 11/2004 | Slocum et al. | |
| 6,933,168 | B2 | 8/2005 | Bawolek et al. | |
| 6,947,143 | B2 * | 9/2005 | Kritchman et al. | 356/416 |
| 7,095,009 | B2 * | 8/2006 | Harada et al. | 250/226 |
| 7,132,644 | B2 | 11/2006 | Grunert et al. | |
| 2002/0003201 | A1 | 1/2002 | Yu | |
| 2003/0128310 | A1 | 7/2003 | Takizawa et al. | |
| 2003/0218123 | A1 * | 11/2003 | Harada et al. | 250/226 |
| 2004/0100570 | A1 | 5/2004 | Shizukuishi | |
| 2004/0105265 | A1 | 6/2004 | Takizawa | |
| 2005/0078187 | A1 | 4/2005 | Fabricius et al. | |
| 2005/0205765 | A1 | 9/2005 | Tan et al. | |
| 2005/0206759 | A1 | 9/2005 | Fukunaga et al. | |
| 2005/0207044 | A1 | 9/2005 | Oon et al. | |
| 2006/0103864 | A1 | 5/2006 | Shannon et al. | |
| 2006/0215193 | A1 | 9/2006 | Shannon et al. | |

OTHER PUBLICATIONS

MAZeT presents True Colour Sensors for Colorimetric, Press Release, MAZeT GmbH, http://www.omimo.be/vpr/layout/display/pr.asp?PRID=7628, Aug. 26, 2004.

"True Color ICs Allow Colour Measurement To DIN 5033," MAZeT Gmb H, http://www.mazet.de/produkte/farbsensoren/mtcs/en, 2005.

"Modular Jencolour Oem Hardware Solution" MAZeT Gmb H, http://www.mazet.de/produkte/farbsensoren/mtcs/en, 2005.

"Data Sheet MTCSiCS, Integral Colour Sensor—LCC8" MAZeT Gmb H, http://www.mazet.de/produkte/farbsensoren/mtcs/en, Apr. 18, 2005.

"Data Sheet MTCSiCT, Integral True Colour Sensor—TO39" MAZeT Gmb H, http://www.mazet.de/produkte/farbsensoren/mtcs/en, Apr. 18, 2005.

"Data Sheet MTCSiCO, Integral True Color Sensor—TO39 with optics" MAZeT Gmb H, http://www.mazet.de/produkte/farbsensoren/mtcs/en, Apr. 18, 2005.

R. W. G. Hunt , Measuring Colour, second ed., pp. 178-181, Ellis Horwood Limited, 1991.

Vos, J.J., Colorimetric and photometric properties of a 2 degree fundamental observer, Color Res. & Appl. 3, 125-128 (1978).

Sharma, G. and Trussell, J.H., "Digital Color Imaging", Jul. 1997, IEEE Transactions on Image Processing, vol. 6, No. 7.

PCT International Search Report for PCT/US05/41628; copy consists of 9 unnumbered pages.

PCT Search Report for PCT/US06/10899; Copy consists of 8 unnumbered pages.

PCT Search Report for PCT/US2006/010724, Aug. 11, 2008, Copy Consists of 10 unnumbered pages.

International Search Report and Written Opinion for PCT/US2006/010724; mailing date Sep. 15, 2006; date of receipt Sep. 18, 2006; copy consists of 12 unnumbered pages.

Mark Wolski, et al., "Optimization of Sensor Response Functions for Colorimetry of Reflective and Emissive Objects," IEEE Transactions on Image Processing, IEEE Service Center, Piscataway, NJ, US, vol. 5, No. 3, Mar. 1996 XP011025973 ISSN: 1057-7149.

Engelhardt, K., et al., "Optimum Color Filters for CCD Digital Cameras" Applied Optics, OSA, Optical Society of America, Washington, DC, US, vol. 32, No. 16, Jun. 1, 1993, pp. 3015-3023, XP000345897 ISSN: 0003-6935.

* cited by examiner

100

102

RECEIVING THE FOLLOWING INPUT:
1) Q COLORANT ABSORBANCE - PER - UNIT - THICKNESS SPECTRA WHERE Q IS THE NUMBER OF DIFFERENT COLORANTS AVAILABLE, (E.G. Q=6, I.E., RED, GREEN, BLUE, CYAN, MAGENTA, AND YELLOW COLORANTS);
2) PHOTODETECTOR SPECTRAL RESPONSE FUNCTION;
3) COLORIMETER OPTICS TRANSMISSION SPECTRA (FOR EXAMPLE: UV & IR FILTERS);
4) TARGET CIE-LIKE COLOR-MATCHING FUNCTIONS;
5) SPECTRAL POWER DISTRIBUTION OF COLORIMETER ILLUMINANT;
6) REFERENCE ILLUMINANT SPECTRUM FOR CALCULATION OF L*, a*, & b* NEEDED FOR ΔE COMPUTATION AND FOR WEIGHTING THE COLOR-MATCHING FUNCTION; AND
7) REFLECTANCE SPECTRA TO BE USED IN OPTIMIZATION

104

DETERMINING OPTIMAL COLORANT THICKNESSES IN EACH CHANNEL AND OPTIMUM LINEAR COMBINATIONS OF CISW CHANNELS THAT BEST MATCH RISW INTEGRAL CIE COLOR-MATCHING FILTERS

106

PROVIDING THE FOLLOWING OUTPUT:
1) THE NUMBER OF CHANNELS, N, NEEDED TO MATCH THE CIE-LIKE TARGET FUNCTIONS;
2) THE MAXIMUM NUMBER OF COLORANT LAYERS NEEDED PER CHANNEL;
3) THE TYPE OF COLORANT NEEDED FOR EACH LAYER (FOR EXAMPLE: RED, GREEN, BLUE, CYAN, MAGENTA, OR YELLOW);
4) THE THICKNESS OF EACH OF THE COLORANT LAYERS;
5) A PLOT OF THE BEST-FIT MATCH TO THE TARGET FUNCTIONS; AND
6) QUANTITATIVE COLOR DIFFERENCE BETWEEN BEST-FIT FUNCTION L*, a*, & b* VALUES AND TARGET L*, a*, & b* VALUES.

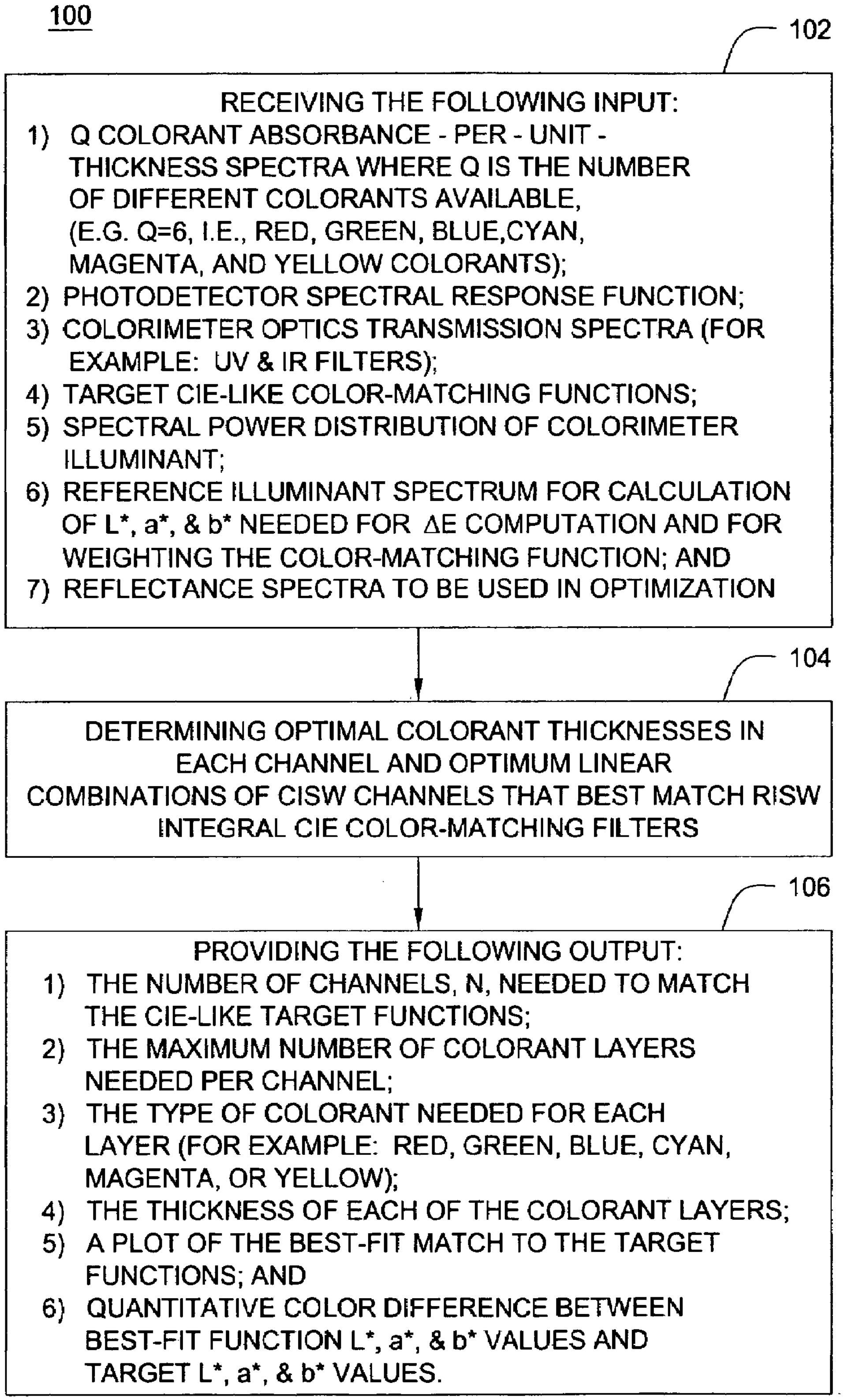

DETERMINING OPTIMAL COLORANT THICKNESSES IN
EACH CHANNEL AND OPTIMUM LINEAR COMBINATIONS
OF CISW CHANNELS THAT BEST MATCH RISW INTEGRAL CIE
COLOR-MATCHING FILTERS

200

CONSIDERING A COLORIMETER THAT HAS A NUMBER
OF CHANNELS = N, WHERE A CHANNEL IS A
FILTER + DETECTOR PAIR. REQUIRE THAT THE
LINEAR COMBINATION OF THE N CISW CHANNELS ADD
UP TO MATCH A SET OF RISW CIE-LIKE TARGET
COLOR-MATCHING FUNCTIONS TO WITHIN
A SET TOLERANCE.

202

FOR EACH CHANNEL CALCULATE:
1) THE REQUIRED COLORANTS NEEDED FOR EACH LAYER;
2) THE NUMBER OF COLORANT LAYERS NEEDED; AND
3) THE THICKNESS OF EACH OF THE REQUIRED COLORANT
   LAYERS; AND
4) THE LINEAR COMBINATION OF CISW CHANNELS THAT BEST
   MATCHES EACH RISW TARGET CIE-LIKE COLOR-MATCHING
   FUNCTION.

204

CONSTRAINING THE SOLUTION WITH THE FOLLOWING CONDITIONS:
1) PREFER SOLUTION WITH THE MINIMUM NUMBER OF
   CHANNELS NEEDED TO ACCEPTABLY MATCH THE
   CIE-LIKE TARGET FUNCTIONS;
2) PREFER SOLUTION WITH MINIMUM NUMBER OF
   COLORANT LAYERS PER CHANNEL THAT DOES NOT
   INCREASE THE NUMBER OF CHANNELS NEEDED FOR
   AN ACCEPTABLE MATCH TO THE TARGET FUNCTION.
3) PREFER SOLUTION THAT MINIMIZES DEVIATIONS
   IN PERFORMANCE UNDER THE INFLUENCE OF
   LAYER THICKNESS VARIATIONS.

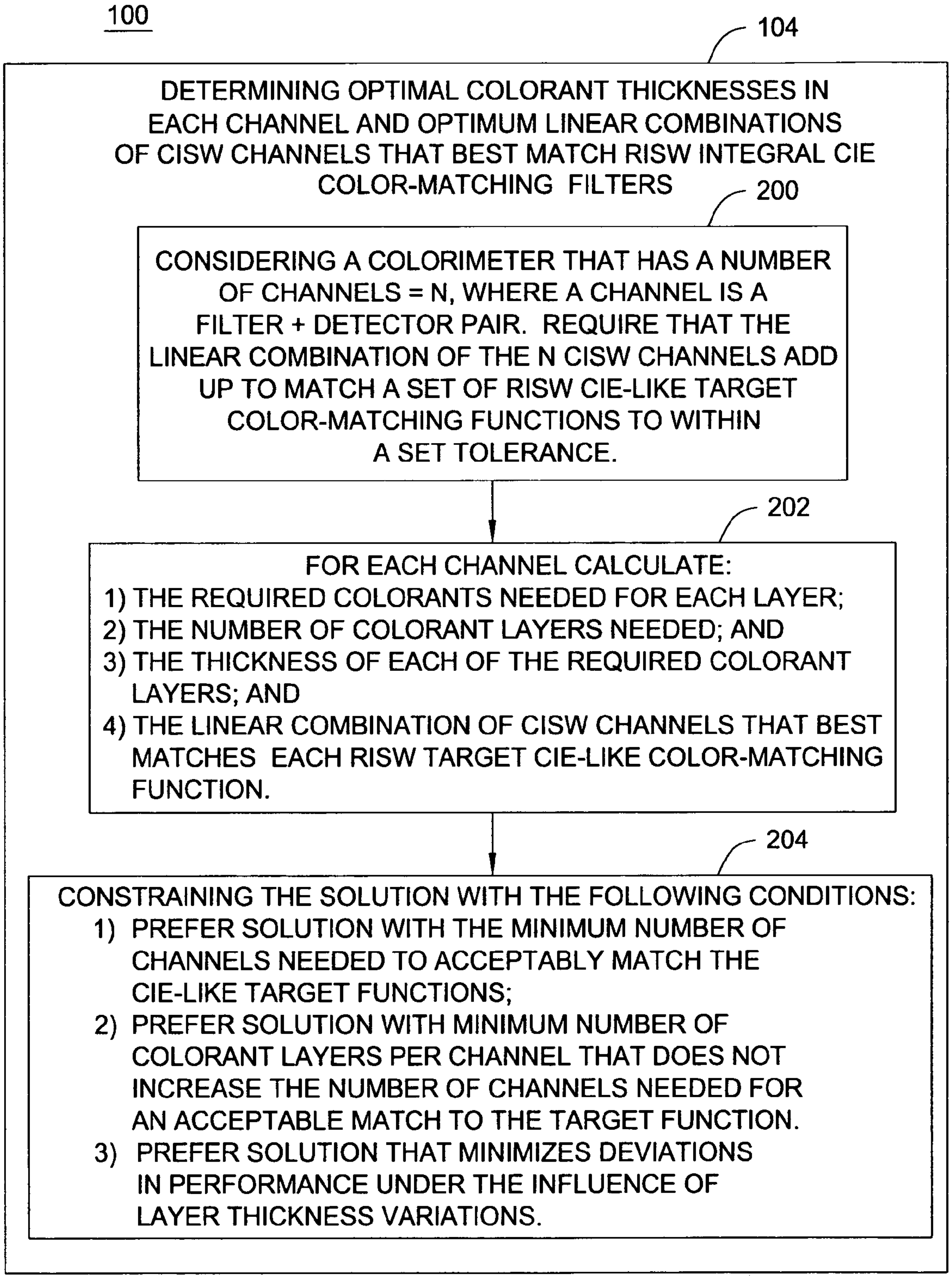

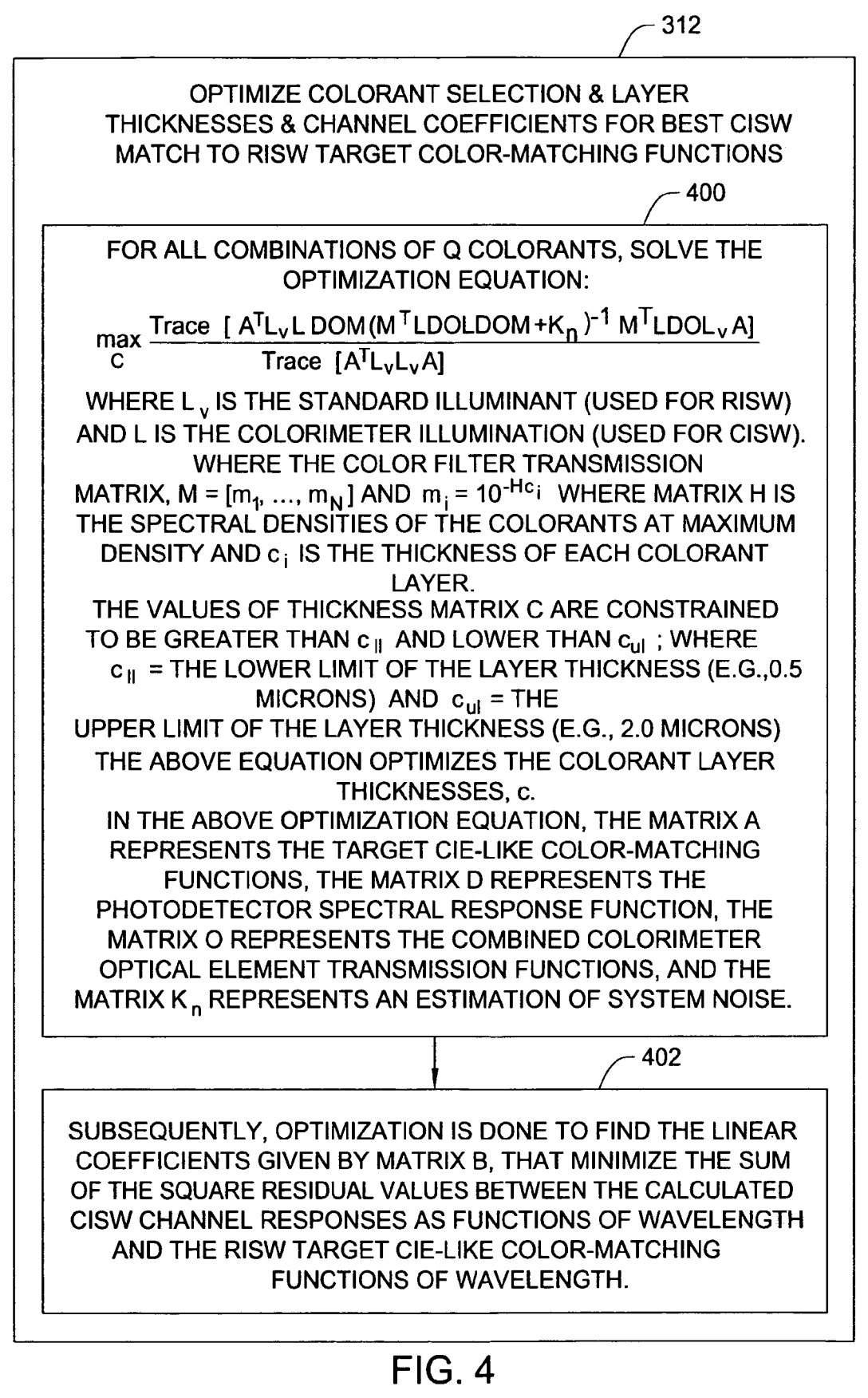

OPTIMIZE COLORANT SELECTION & LAYER THICKNESSES & CHANNEL COEFFICIENTS FOR BEST CISW MATCH TO RISW TARGET COLOR-MATCHING FUNCTIONS

400

FOR ALL COMBINATIONS OF Q COLORANTS, SOLVE THE OPTIMIZATION EQUATION:

$$\max_{c} \frac{\text{Trace}\ [A^T L_v L\, DOM(M^T LDOLDOM + K_n)^{-1} M^T LDOL_v A]}{\text{Trace}\ [A^T L_v L_v A]}$$

WHERE $L_v$ IS THE STANDARD ILLUMINANT (USED FOR RISW) AND L IS THE COLORIMETER ILLUMINATION (USED FOR CISW).
WHERE THE COLOR FILTER TRANSMISSION MATRIX, $M = [m_1, \ldots, m_N]$ AND $m_i = 10^{-Hc_i}$ WHERE MATRIX H IS THE SPECTRAL DENSITIES OF THE COLORANTS AT MAXIMUM DENSITY AND $c_i$ IS THE THICKNESS OF EACH COLORANT LAYER.
THE VALUES OF THICKNESS MATRIX C ARE CONSTRAINED TO BE GREATER THAN $c_{ll}$ AND LOWER THAN $c_{ul}$ ; WHERE $c_{ll}$ = THE LOWER LIMIT OF THE LAYER THICKNESS (E.G.,0.5 MICRONS) AND $c_{ul}$ = THE UPPER LIMIT OF THE LAYER THICKNESS (E.G., 2.0 MICRONS)
THE ABOVE EQUATION OPTIMIZES THE COLORANT LAYER THICKNESSES, c.
IN THE ABOVE OPTIMIZATION EQUATION, THE MATRIX A REPRESENTS THE TARGET CIE-LIKE COLOR-MATCHING FUNCTIONS, THE MATRIX D REPRESENTS THE PHOTODETECTOR SPECTRAL RESPONSE FUNCTION, THE MATRIX O REPRESENTS THE COMBINED COLORIMETER OPTICAL ELEMENT TRANSMISSION FUNCTIONS, AND THE MATRIX $K_n$ REPRESENTS AN ESTIMATION OF SYSTEM NOISE.

402

SUBSEQUENTLY, OPTIMIZATION IS DONE TO FIND THE LINEAR COEFFICIENTS GIVEN BY MATRIX B, THAT MINIMIZE THE SUM OF THE SQUARE RESIDUAL VALUES BETWEEN THE CALCULATED CISW CHANNEL RESPONSES AS FUNCTIONS OF WAVELENGTH AND THE RISW TARGET CIE-LIKE COLOR-MATCHING FUNCTIONS OF WAVELENGTH.

FIG. 4

COMPUTE ΔE FOR TEST REFLECTANCE SPECTRA — 314

500 — FOR THE NEW COLORANT LAYER STRUCTURE (I.E., COLORANT LAYER TYPE AND THICKNESS MATRIX C), COMPUTE THE MAX AND MEAN CIELAB ΔE FOR THE SPECTRAL REFLECTANCES IN THE TEST REFLECTANCE SET. THE ΔE VALUE IS BETWEEN THE L*, a*, & b* VALUES OBTAINED FROM THE CALCULATED BEST-FIT CISW COLOR-MATCHING FUNCTIONS AND THOSE VALUES FOUND USING THE RISW TARGET CIE-LIKE FUNCTIONS.

502 — CALCULATE THE L*, a*, & b* VALUES USING THE REFERENCE ILLUMINANT SPECTRUM.

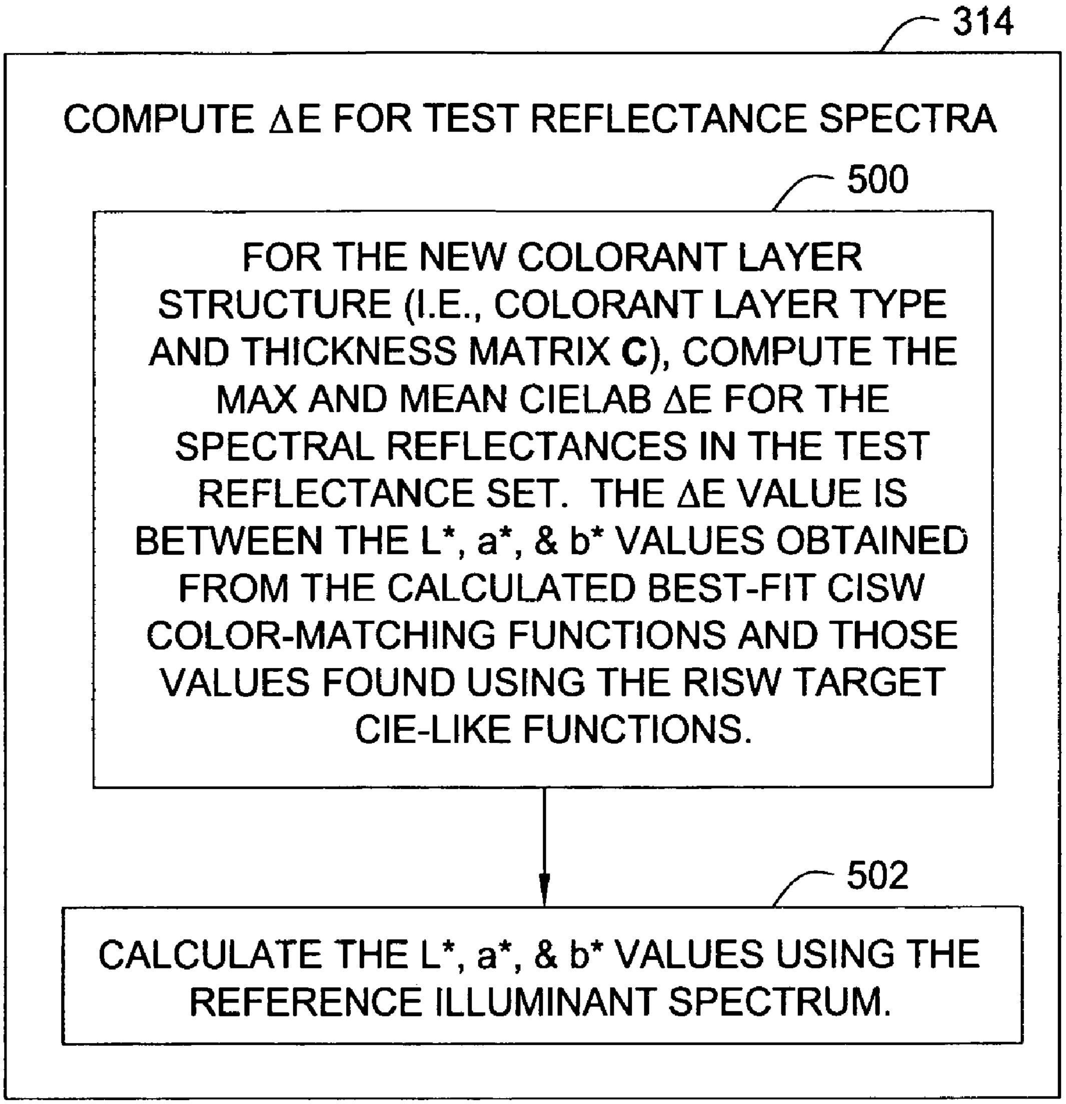

TEST FOR LAYER THICKNESS VARIATION AND SORT BY A FIGURE OF MERIT VALUE

700

FOR THE (E.G.,TOP 100) BEST PERFORMING LAYER STRUCTURES, TEST THE SENSITIVITY TO LAYER THICKNESS VARIATIONS BY COMPUTING THE MAX AND MEAN $\Delta E$ VALUES, WITH EACH LAYER THICKNESS HAVING BEEN INCREASED AND DECREASED BY SOME VARIATION TOLERANCE (E.G., 0.1 MICRONS).

702

FOR A GIVEN NUMBER OF CHANNELS, N, (E.G., N = 3, 4, 5, & 6) AND A GIVEN NUMBER OF FILTER LAYERS (E.G., 1, 2, 3, OR 4), SELECT OUT THE OPTIMUM LAYER STRUCTURE FOR EACH CONFIGURATION.
FOR EXAMPLE, SELECT OUT THE OPTIMUM STRUCTURE FOR A 4 CHANNEL CONFIGURATION THAT ALLOWS UP TO 2 LAYERS FOR EACH CHANNEL; AND SELECT OUT THE OPTIMUM STRUCTURE FOR A 5 CHANNEL CONFIGURATION THAT ALLOW ONLY A SINGLE LAYER FOR EACH CHANNEL, AND SO FORTH.

704

CHOOSE THE OPTIMUM LAYER STRUCTURE BY SELECTING THE STRUCTURE THAT WAS THE LEAST SENSITIVE TO LAYER THICKNESS VARIATIONS. THIS IS DONE BY SORTING THE RESULTS FOR THE SMALLEST MAX AND MEAN $\Delta E$ VALUES COMPUTED USING THE LAYER THICKNESS VARIATION TEST.

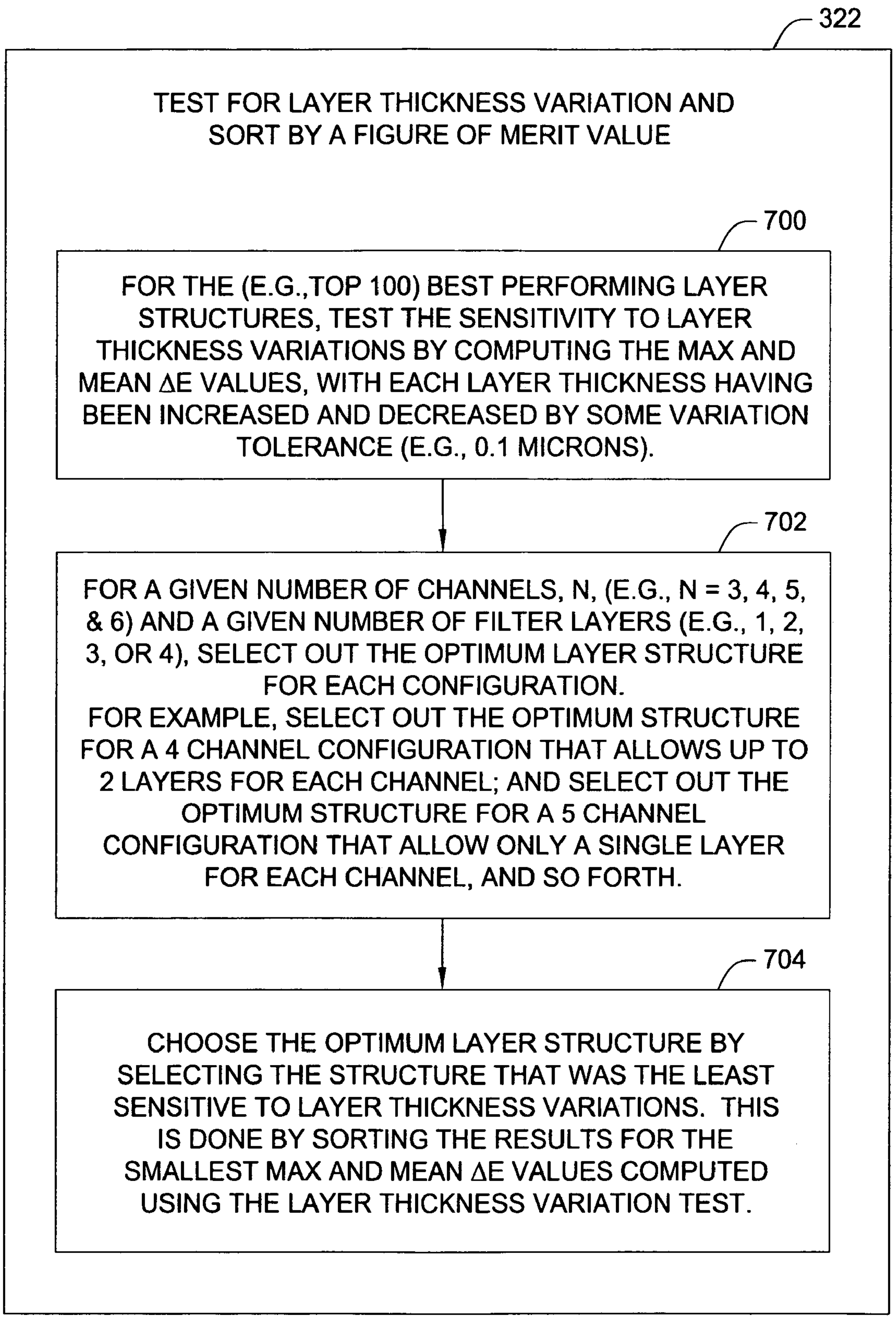

Figure 10:
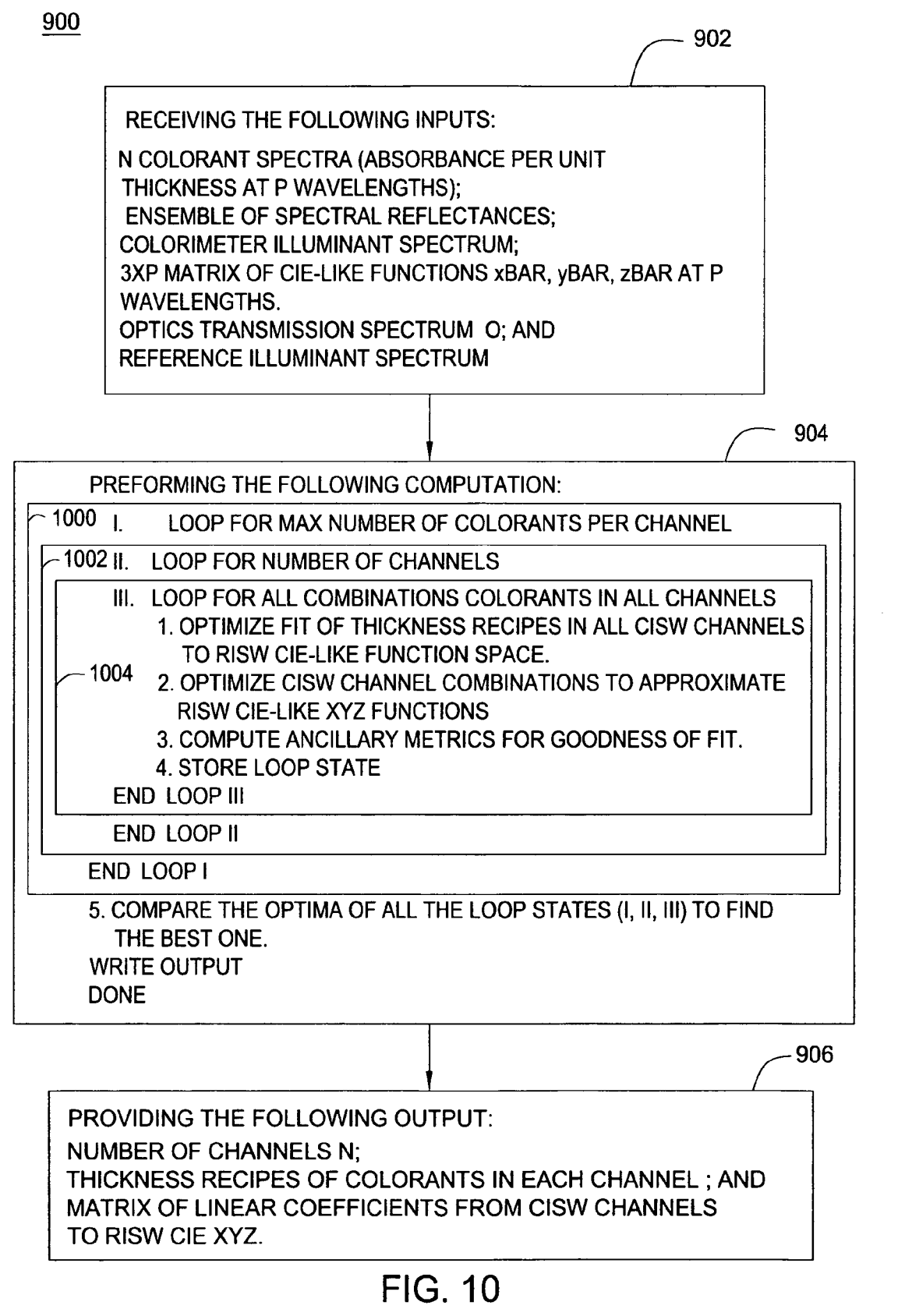

RECEIVING THE FOLLOWING INPUTS:

N COLORANT SPECTRA (ABSORBANCE PER UNIT THICKNESS AT P WAVELENGTHS);
ENSEMBLE OF SPECTRAL REFLECTANCES;
COLORIMETER ILLUMINANT SPECTRUM;
3XP MATRIX OF CIE-LIKE FUNCTIONS xBAR, yBAR, zBAR AT P WAVELENGTHS.
OPTICS TRANSMISSION SPECTRUM O; AND
REFERENCE ILLUMINANT SPECTRUM

904

PREFORMING THE FOLLOWING COMPUTATION:

1000 I. LOOP FOR MAX NUMBER OF COLORANTS PER CHANNEL

1002 II. LOOP FOR NUMBER OF CHANNELS

1004 III. LOOP FOR ALL COMBINATIONS COLORANTS IN ALL CHANNELS

1. OPTIMIZE FIT OF THICKNESS RECIPES IN ALL CISW CHANNELS TO RISW CIE-LIKE FUNCTION SPACE.
2. OPTIMIZE CISW CHANNEL COMBINATIONS TO APPROXIMATE RISW CIE-LIKE XYZ FUNCTIONS
3. COMPUTE ANCILLARY METRICS FOR GOODNESS OF FIT.
4. STORE LOOP STATE

END LOOP III

END LOOP II

END LOOP I

5. COMPARE THE OPTIMA OF ALL THE LOOP STATES (I, II, III) TO FIND THE BEST ONE.

WRITE OUTPUT
DONE

906

PROVIDING THE FOLLOWING OUTPUT:

NUMBER OF CHANNELS N;
THICKNESS RECIPES OF COLORANTS IN EACH CHANNEL ; AND
MATRIX OF LINEAR COEFFICIENTS FROM CISW CHANNELS TO RISW CIE XYZ.

Figure 14:
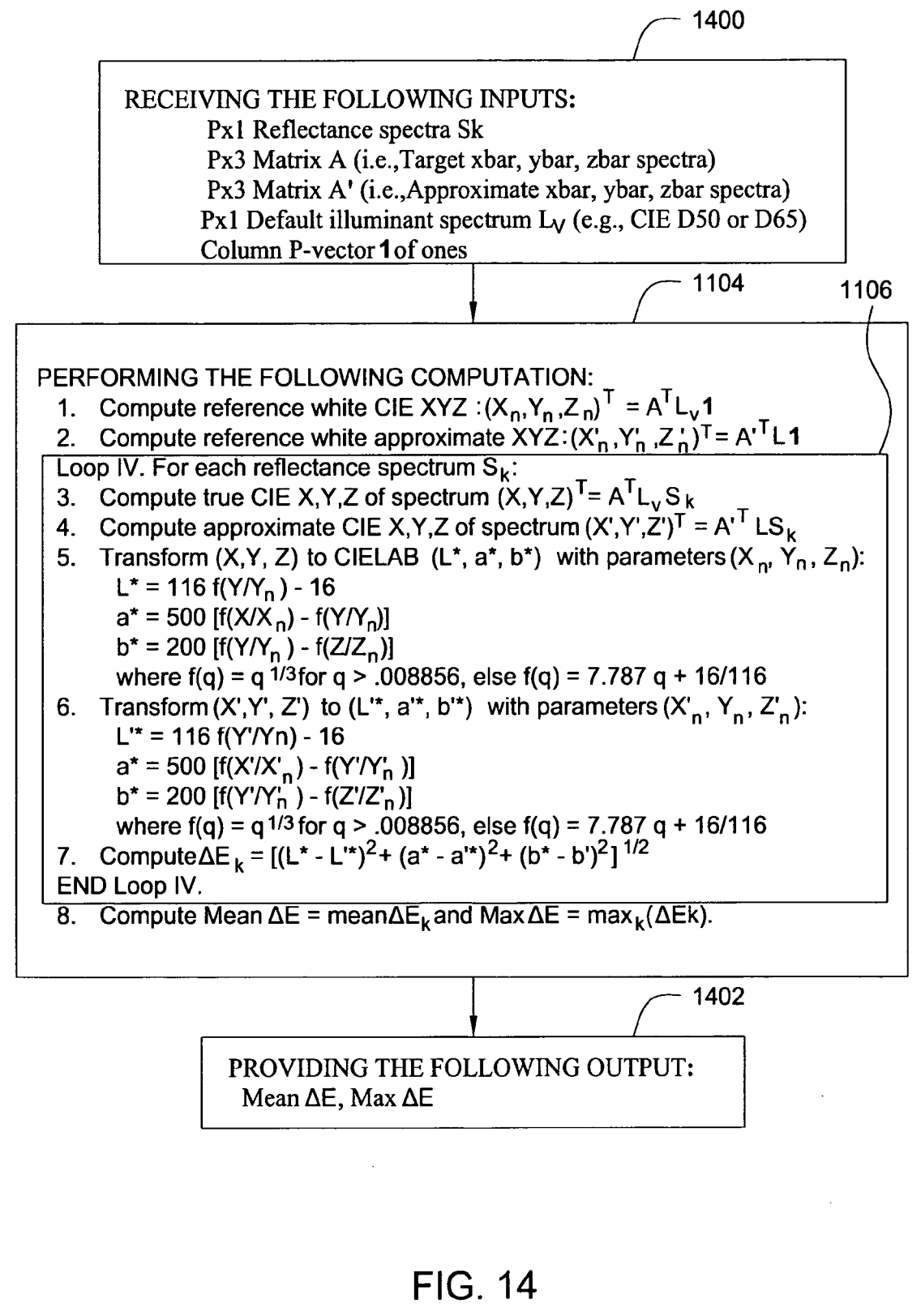

RECEIVING THE FOLLOWING INPUTS:

Px1 Reflectance spectra Sk

Px3 Matrix A (i.e.,Target xbar, ybar, zbar spectra)

Px3 Matrix A' (i.e.,Approximate xbar, ybar, zbar spectra)

Px1 Default illuminant spectrum $L_V$ (e.g., CIE D50 or D65)

Column P-vector 1 of ones 1104 1106

PERFORMING THE FOLLOWING COMPUTATION:

1. Compute reference white CIE XYZ : $(X_n, Y_n, Z_n)^T = A^T L_v \mathbf{1}$
2. Compute reference white approximate XYZ: $(X'_n, Y'_n, Z'_n)^T = A'^T L \mathbf{1}$ Loop IV. For each reflectance spectrum $S_k$:

3. Compute true CIE X,Y,Z of spectrum $(X,Y,Z)^T = A^T L_v S_k$
4. Compute approximate CIE X,Y,Z of spectrum $(X',Y',Z')^T = A'^T L S_k$
5. Transform (X,Y, Z) to CIELAB (L*, a*, b*) with parameters $(X_n, Y_n, Z_n)$:
   $L^* = 116\ f(Y/Y_n) - 16$
   $a^* = 500\ [f(X/X_n) - f(Y/Y_n)]$
   $b^* = 200\ [f(Y/Y_n) - f(Z/Z_n)]$
   where $f(q) = q^{1/3}$ for $q > .008856$, else $f(q) = 7.787\ q + 16/116$
6. Transform (X',Y', Z') to (L'*, a'*, b'*) with parameters $(X'_n, Y_n, Z'_n)$:
   $L'^* = 116\ f(Y'/Yn) - 16$
   $a^* = 500\ [f(X'/X'_n) - f(Y'/Y'_n)]$
   $b^* = 200\ [f(Y'/Y'_n) - f(Z'/Z'_n)]$
   where $f(q) = q^{1/3}$ for $q > .008856$, else $f(q) = 7.787\ q + 16/116$
7. Compute $\Delta E_k = [(L^* - L'^*)^2 + (a^* - a'^*)^2 + (b^* - b')^2]^{1/2}$ END Loop IV.

8. Compute Mean $\Delta E = \text{mean}\Delta E_k$ and Max $\Delta E = \max_k(\Delta Ek)$.

1402

PROVIDING THE FOLLOWING OUTPUT:

Mean ΔE, Max ΔE

RECEIVING THE FOLLOWING INPUT:
TABULATED RECORDS, EACH CONTAINING THE FOLLOWING: N, n', CHANNEL COLORANT COMBINATIONS, LSBF RESIDUAL, MEAN CIELAB $\Delta E$, MAX CIELAB $\Delta E$, THICKNESS RECIPES $c_i$, AND COEFFICIENT MATRIX B.

1106

PERFORMING THE FOLLOWING COMPUTATION:
1. SEPARATELY SORT RECORDS IN DECREASING LSBF RESIDUAL, MEAN CIELAB $\Delta E$, MAX CIELAB $\Delta E$.
2. OF THE BEST (E.G., 50 OR 100) ON EACH SORT, SIMULATE VARIATION OF THE FILTER THICKNESS FROM THE NOMINAL VALUES, AND RECOMPUTE THE $\Delta E$ VALUES.
3. SELECT AS BEST THE RECORD LEAST SENSITIVE TO VARIATIONS.

1502

PROVIDING THE FOLLOWING OUTPUT:
WINNING RECORD, CONTAINING THE FOLLOWING: N, n', CHANNEL COLORANT COMBINATIONS, LSBF RESIDUAL, MEAN CIELAB $\Delta E$, MAX CIELAB $\Delta E$, THICKNESS RECIPES $c_i$, AND COEFFICIENT MATRIX B.

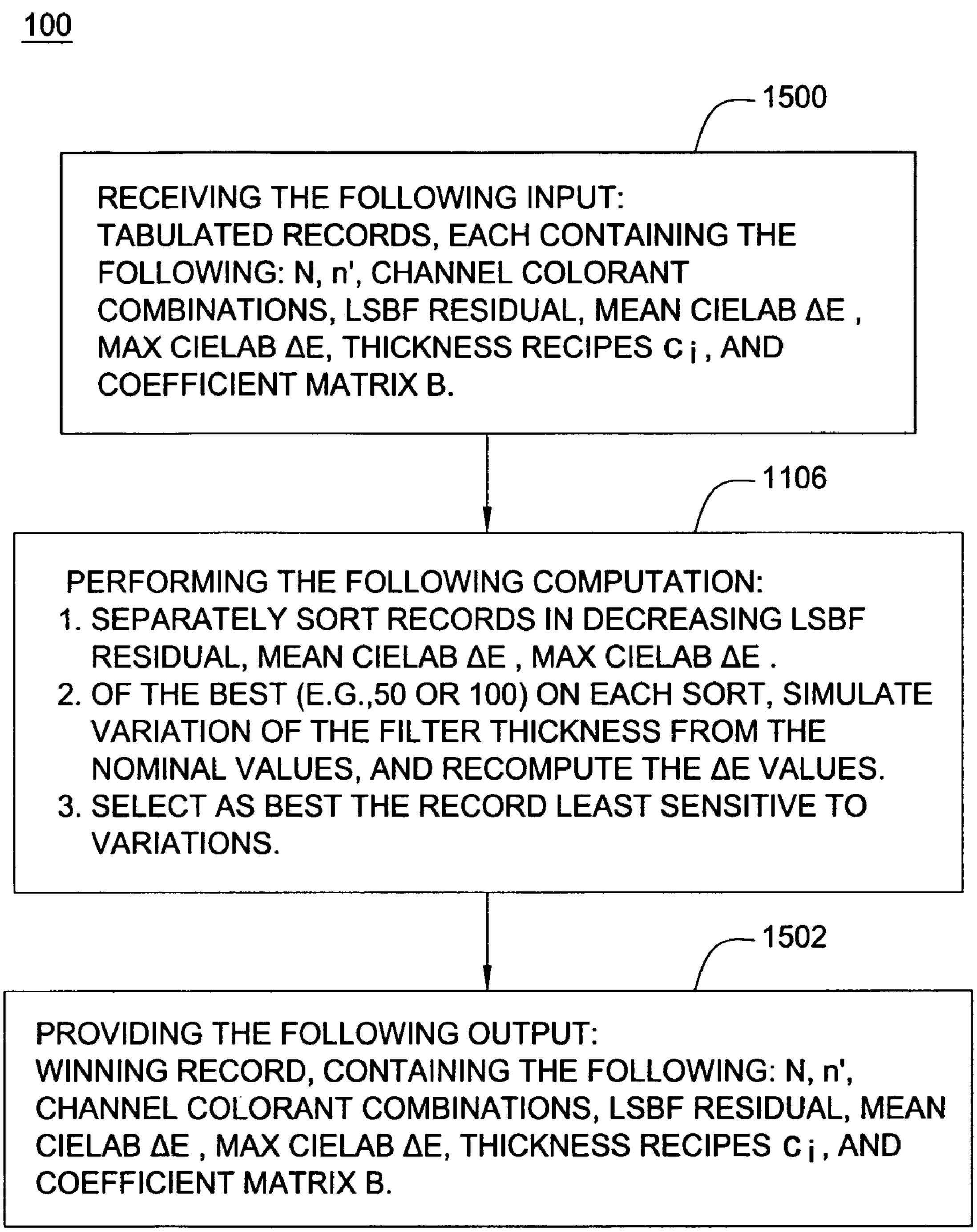

FIG. 15

$\Delta E$ RESULTS USING PROJECTION TRANSFORMATION WITH DOUBLE-COATED FILTERS AND WARM WHITE LED ILLUMINATION, D50 VIEWING ILLUMINATION

| Number of Filters | SNR (dB) | Nominal $\Delta E_{max}$ | Nominal $\Delta E_{avg}$ | Deviation MAX $\Delta E_{max}$ | Deviation MAX $\Delta E_{avg}$ |
|---|---|---|---|---|---|
| 4 | 70 | 1.173 | 0.100 | 2.628 | 0.111 |
| | 80 | 0.729 | 0.033 | 0.866 | 0.035 |
| | 90 | 0.238 | 0.010 | 0.297 | 0.012 |
| 5 | 70 | 0.639 | 0.048 | 1.369 | 0.057 |
| | 80 | 0.275 | 0.015 | 0.465 | 0.018 |
| | 90 | 0.057 | 0.005 | 0.188 | 0.006 |

FIG. 30

$\Delta E$ RESULTS USING PROJECTION TRANSFORMATION WITH DOUBLE-COATED FILTERS AND WARM WHITE LED ILLUMINATION, D65 VIEWING ILLUMINATION

| Number of Filters | SNR (dB) | Nominal $\Delta E_{max}$ | Nominal $\Delta E_{avg}$ | Deviation MAX $\Delta E_{max}$ | Deviation MAX $\Delta E_{avg}$ |
|---|---|---|---|---|---|
| 4 | 70 | 1.164 | 0.105 | 2.917 | 0.113 |
| | 80 | 0.697 | 0.035 | 0.938 | 0.037 |
| | 90 | 0.168 | 0.011 | 0.321 | 0.012 |
| 5 | 70 | 0.520 | 0.046 | 1.648 | 0.056 |
| | 80 | 0.324 | 0.015 | 0.550 | 0.018 |
| | 90 | 0.094 | 0.005 | 0.142 | 0.006 |

FIG. 31

$\Delta E$ RESULTS USING PROJECTION TRANSFORMATION WITH DOUBLE-COATED FILTERS AND TUNGSTEN ILLUMINATION, D50 VIEWING ILLUMINATION

| Number of Filters | SNR (dB) | Nominal $\Delta E_{max}$ | Nominal $\Delta E_{avg}$ | Deviation MAX $\Delta E_{max}$ | Deviation MAX $\Delta E_{avg}$ |
|---|---|---|---|---|---|
| 4 | 70 | 1.869 | 0.147 | 5.303 | 0.184 |
| | 80 | 0.561 | 0.046 | 1.199 | 0.059 |
| | 90 | 0.164 | 0.015 | 0.488 | 0.019 |
| 5 | 70 | 2.368 | 0.107 | 4.951 | 0.125 |
| | 80 | 0.522 | 0.033 | 1.114 | 0.039 |
| | 90 | 0.189 | 0.010 | 0.418 | 0.012 |

FIG. 32

$\Delta E$ RESULTS USING PROJECTION TRANSFORMATION WITH DOUBLE-COATED FILTERS AND TUNGSTEN ILLUMINATION, D65 VIEWING ILLUMINATION

| Number of Filters | SNR (dB) | Nominal $\Delta E_{max}$ | Nominal $\Delta E_{avg}$ | Deviation MAX $\Delta E_{max}$ | Deviation MAX $\Delta E_{avg}$ |
|---|---|---|---|---|---|
| 4 | 70 | 2.464 | 0.150 | 5.890 | 0.185 |
| | 80 | 0.809 | 0.047 | 1.547 | 0.059 |
| | 90 | 0.209 | 0.015 | 0.519 | 0.019 |
| 5 | 70 | 1.738 | 0.106 | 4.233 | 0.127 |
| | 80 | 0.576 | 0.034 | 1.385 | 0.042 |
| | 90 | 0.227 | 0.010 | 0.417 | 0.013 |

FIG. 33

COATING THICKNESS IN MICRONS OF EACH COLORANT FOR SETS OF 4 FILTERS

| FILTER SET | BLUE | GREEN | RED | CYAN | MAGENTA | YELLOW |
|---|---|---|---|---|---|---|
| TUNGSTEN | 0.00 | 0.93 | 0.00 | 0.76 | 0.00 | 0.00 |
| | 0.00 | 0.71 | 0.00 | 0.00 | 0.89 | 0.00 |
| | 0.00 | 0.00 | 0.00 | 1.34 | 1.85 | 0.00 |
| | 0.000 | 0.00 | 0.00 | 0.52 | 0.00 | 0.83 |
| WARM LED | 0.00 | 1.82 | 0.00 | 0.00 | 0.00 | 0.00 |
| | 3.00 | 0.00 | 0.00 | 3.00 | 0.00 | 0.00 |
| | 0.00 | 0.00 | 0.00 | 1.31 | 0.80 | 0.00 |
| | 0.00 | 0.00 | 0.00 | 0.00 | 0.00 | 1.71 |

FIG. 34

COATING THICKNESS IN MICRONS OF EACH COLORANT FOR SETS OF 5 FILTERS

| FILTER SET | BLUE | GREEN | RED | CYAN | MAGENTA | YELLOW |
|---|---|---|---|---|---|---|
| TUNGSTEN | 0.00 | 0.00 | 1.40 | 0.00 | 0.00 | 0.00 |
| | 0.00 | 0.67 | 0.00 | 1.37 | 0.00 | 0.00 |
| | 0.00 | 0.55 | 0.00 | 0.00 | 0.00 | 0.58 |
| | 0.00 | 0.00 | 0.00 | 1.10 | 1.44 | 0.00 |
| | 0.00 | 0.00 | 0.00 | 1.76 | 0.00 | 0.55 |
| WARM LED | 1.91 | 0.00 | 0.00 | 0.00 | 0.00 | 0.00 |
| | 1.67 | 0.00 | 0.00 | 3.00 | 0.00 | 0.00 |
| | 0.00 | 2.05 | 0.60 | 0.00 | 0.00 | 0.00 |
| | 0.00 | 0.64 | 0.00 | 0.00 | 1.54 | 0.00 |
| | 0.00 | 0.00 | 0.00 | 2.60 | 0.00 | 3.00 |

FIG. 35

METHOD FOR DESIGNING A COLORIMETER HAVING INTEGRAL ILLUMINANT-WEIGHTED CIE COLOR-MATCHING FILTERS

CROSS-REFERENCES

The present application claims the benefit of Provisional Application No. 60/664,117, filed Mar. 23, 2005, which is herein incorporated by reference. The present application is a continuation-in-part of commonly owned, pending U.S. application Ser. No. 11/281,766, entitled "METHOD FOR DESIGNING A COLORIMETER HAVING INTEGRAL CIE COLOR-MATCHING FILTERS", filed Nov. 16, 2005, now U.S. Pat. No. 7,420,680 which is herein incorporated by reference. The present application is related to commonly owned U.S. Pat. No. 6,163,377, entitled "COLORIMETER", issued Dec. 19, 2000, which is herein incorporated by reference.

BACKGROUND

1. Field of the Invention

Embodiments of the present invention generally relate to optical Commission Internationale de l'Eclairage (CIE) color-matching filters and, more specifically, to a method for determining optical colorant thicknesses for deposited filters designed through the use of varying densities of a controlled set of colorants, such that, when weighted by an available illuminant spectrum, the deposited filters approximate CIE-like color-matching filters weighted by a colorimeter illuminant spectrum.

2. Description of Related Art

Optical filters are used in many color-related applications, including various color measurement systems, such as colorimeters. There are many types of filters, including absorptive filters, interference filters, and others. A photoelectric tristimulus colorimeter is used to measure the color of light incident on the device. If such light is emitted from a light source, such as a computer display screen, the colorimeter is performing an emissive color measurement. However, the subject of this invention is a reflective photoelectric colorimeter. Such a colorimeter has a light source that directs light through an optical system against a color sample. The light is reflected by the color sample toward three or more photoelectric detecting devices. A primary filter is positioned in front of each photoelectric detecting device. In one technology, each primary filter substantially conforms the spectral sensitivity of the photoelectric detecting device to a linear combination of the color-matching functions. A measuring device, which is connected to the photoelectric detecting devices, reads or measures the amounts of the respective primaries or tristimulus values in response to the incident light. It may, however, be desirable to estimate the tristimulus values that would be produced by the sample under a reference light (such as a CIE standard illuminant), even when the actual colorimeter light has a known but different spectrum. In that case, each primary filter substantially conforms to a linear combination of the color-matching functions, weighted by the ratio of the spectrum of the reference light to the spectrum of the actual colorimeter light.

Although it is theoretically possible to design primary filters exactly corresponding to an ideal, it is practically impossible to manufacture primary filters having transmission factors exactly corresponding to the ideal. This is because an error is inherent in measuring primary or tristimulus values of the color sample. This error is caused by differences between actual and theoretical transmission factors of the primary filters.

Past attempts to correct this error have involved attempts to alter the transmission factor characteristics of the primary filters by forming the primary filters using a number of superimposed colored plates. However, because the spectral characteristics of the colored plates depend upon the components of the materials used in the plates—normally glass—it was generally impossible to exactly match the theoretical transmission factors. It was prohibitively difficult to accurately duplicate the theoretical transmission values over the complete wavelength range of the primaries or tristimulus values. These past attempts that increased the number of plates, undesirably decreased the amount of light received or passed through the primary filter. In addition, past attempts to fabricate primary filters by carefully superimposing a number of plates in an attempt to match theoretical transmission factors were time consuming and expensive to make.

SUMMARY

The present invention includes various embodiments of a method for designing a colorimeter having integral illuminant-weighted CIE color-matching filters, including determining optimal colorant thicknesses. The following definitions apply herein. The colorimeter illuminant is the spectrum of light used in the colorimeter itself. The reference illuminant is the spectrum of light (e.g., a CIE standard illuminant) under which it is desired to measure the tristimulus values of the sample.

One embodiment is a method for determining the design of a color-measuring device. The color-measuring device includes light detectors and colorants. The colorants are permanently deposited onto the color-measuring device. The colorants comprise optical filters and reflected light passes through the filters to cause the light detectors to produce output. The output of all the detectors can be combined to approximate the spectral responses of one or more CIE-like color-matching functions weighted by a reference illuminant spectrum.

Another embodiment is a method for designing a colorimeter having integral illuminant-weighted CIE color-matching filters. A set of channels is determined from a plurality of channels. A set of filters is determined. Each filter is permanently deposited on each of the channels. Each filter is an absorptive filter and each filter has at least one layer. There is at least one channel with a double layer so that a linear combination of the set of channels weighted by a colorimeter illuminant spectrum matches a set of CIE-like target color-matching functions weighted by a reference illuminant spectrum within a tolerance. Each channel integrates one or more detectors and one or more filters onto a single semiconductor device. A colorant is determined for each layer on each channel from a set of colorants. A thickness of each layer on each channel is also determined.

Yet another embodiment is a method for designing a colorimeter having integral illuminant-weighted CIE color-matching filters. Colorants and target CIE-like functions are received. Channel colorant recipes and additive mixtures of channels weighted by a colorimeter illuminant spectrum to match the target CIE-like functions weighted by a reference illuminant spectrum within a tolerance are determined for a minimum number of channels and colorants per channel. Each channel is one of the channels in a colorimeter. Each channel has at least one filter covering each detector. The best solution from the channel colorant recipes and the additive mixtures of channels is provided. The best solution includes the number of channels, the thickness for each colorant in each channel, and a matrix of linear coefficients. Another embodiment is a computer-readable medium having stored thereon a plurality of instructions, the plurality of instructions including instructions which, when executed by a processor, cause the processor to perform the steps of this method.

BRIEF DESCRIPTION OF THE DRAWINGS

The teachings of the present invention can be readily understood by considering the following detailed description in conjunction with the accompanying drawings, in which:

FIG. 1 is a flow chart showing an overview of an exemplary embodiment of the method for designing a colorimeter having integral illuminant-weighted CIE color-matching filters;

FIGS. 2, 3, 4, 5, 6, 7, and 8 are flow charts showing the method of FIG. 1 in more detail;

FIGS. 10, 11, 12, 13, 14, and 15 are flow charts showing the method of FIG. 9 in more detail;

FIG. 30 is a table showing ΔE results using projection transformation with double-coated filters and the warm white LED illumination, D50 reference illumination in the computational study;

FIG. 31 is a table showing ΔE results using projection transformation with double-coated filters and the warm white LED illumination, D65 reference illumination in the computational study;

FIG. 32 is a table showing ΔE results using projection transformation with double-coated filters and the tungsten illumination, D50 reference illumination in the computational study;

FIG. 33 is a table showing ΔE results using projection transformation with double-coated filters and the tungsten illumination, D65 reference illumination in the computational study;

FIG. 34 is a table showing coating thickness in microns of each colorant for sets of four filters in the computational study;

FIG. 35 is a table showing coating thickness in microns of each colorant for sets of five filters in the computational study.

To facilitate understanding, identical reference numerals have been used, where possible, to designate identical elements that are common to the figures.

DETAILED DESCRIPTION

Figure 3:
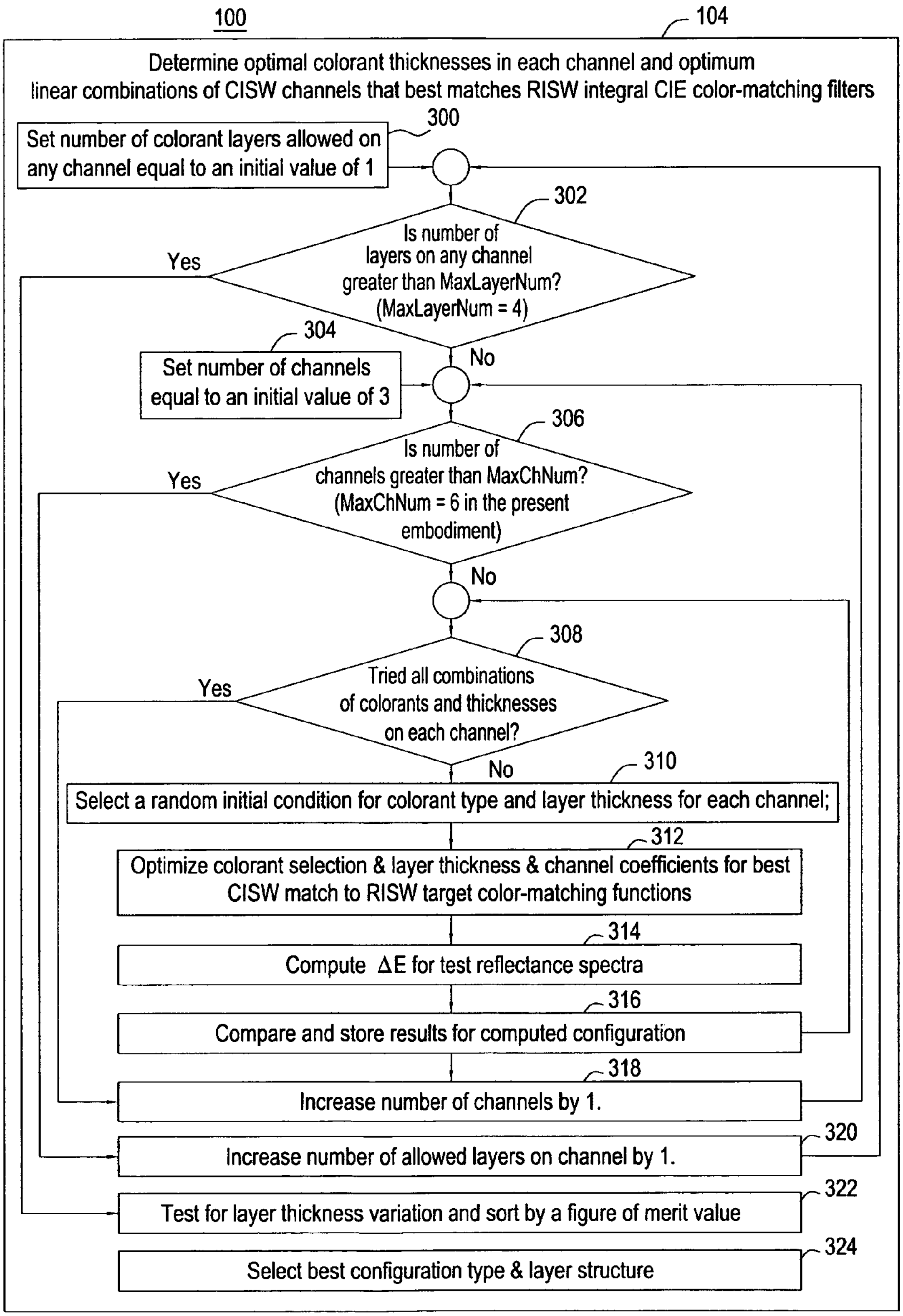

The present invention includes various embodiments of a method for designing a colorimeter having integral illuminant-weighted CIE color-matching filters, including determining optimal colorant thicknesses. Colorants include pigments, dyes, and the like. For example, a printer calibration device designed according to an embodiment of the method for designing a reflectance colorimeter having integral illuminant-weighted CIE color-matching filters has many advantages, including a lower cost for production and calibration than existing devices, elimination of high loss optical elements, such as a diffuser and lens, and uniform characteristics due to minimal chip-to-chip variation in semiconductor fabrication. Such a printer calibration device may be standalone or embedded. However, embodiments of the present invention have many applications in colorimetry in addition to printer calibration devices. Colorimetry is the science and practice of determining and specifying colors and quantitative analysis by color comparison. In colorimetry, colors can be described in numbers and physical color can be matched using a variety of measurement instruments, such as colorimeters, spectrophotometers, densitometers, and spectroradiometers. Colorimetry is used in many industries, including chemistry, color printing, textile manufacturing, paint manufacturing, graphic arts, and consumer electronics. A person of ordinary skill in the art will recognize that the present invention is applicable to many applications of colorimetry in many industries and to many kinds of measurement instruments.

One embodiment is a reflectance color-measuring device, such as a reflectance colorimeter. The colorimeter is a solid-state device having light detectors and filters. Colorants are permanently deposited onto the solid-state device using methods familiar to those of ordinary skill in the art of manufacturing solid-state light detectors. The device has an output of spectral responses that can be combined to approximate CIE or CIE-like color-matching functions, weighted by a reference illuminant spectrum. Some examples of CIE-like color-matching filters include the CIE 1931 2-degree color-matching functions, the CIE 1964 10-degree color-matching functions or modifications of the CIE functions, such as derived by D. Judd (1951) or by J. J. Vos (1978). In one embodiment, the colorants are in the form of dyes or pigments. In one embodiment, the filters include a number of colorants of various thicknesses and in various combinations, weighted by a colorimeter illuminant spectrum. The colorants are permanently deposited onto either a single detector or a plurality of detectors on the device.

Embodiments of the present invention, in conjunction with a colorimeter light source of known spectrum, achieve color separation and approximation of the CIE color matching functions, weighted by a reference illuminant spectrum, through the use of multiple color filters. The spectral transmission of each filter is designed through the use of varying densities of a small set of colorants with the goal of determining the optimal thickness of each colorant layer, as well as the number of channels necessary to achieve a desired level of colorimetric performance.

Unlike an emissive colorimeter, a reflectance colorimeter that is designed using embodiments of the present invention includes a sensor and an illumination source. Such a reflectance colorimeter operates as if it had CIE-like filters and was measuring the sample reflectance under a reference illuminant. A much wider range of spectral distributions needs to be measured in embodiments of the present invention, because the variation of reflectance spectra is much greater than the variation of radiant spectra from the subject being measured (e.g., a monitor). CIEXYZ values are determined for certain illuminations, such as D50 and D65 illuminations. An exemplary embodiment of a design process uses reference reflectance spectra, such as the ceramic tile reflectance spectra available from CERAM Research (formerly British Ceramic Research Association (BCRA)) or Munsell reflectance spectra available from GretagMacbeth. In a computational study, three different light sources were used: a standard white light-emitting diode (LED), a tungsten light source with a correlated color temperature of 2900K, and a warm white LED source. As one of skill in the art recognizes, other light sources that provide a smooth spectrum throughout the visible range may also be used.

One embodiment is a method of designing a sensor for use in a reflectance colorimeter. A solution of combinations of colorants is derived, where the solution maximizes the number of combinations of colorants used singly and minimizes the combinations of colorants, weighted by a colorimeter illuminant spectrum. In one embodiment, this method is computational and may operate on a processor. In one embodiment, the method results in a selection of the best or the optimum combination of colorants according to predetermined criteria. The combination of colorants is used on the light detectors, which have known responses to light photons. The colorants are computationally selected from a larger set of colorants. The computation takes into account the combined response of the light source, the colorants, and the detectors to select the best or optimum solution so that the output of the device has spectral responses that approximate reference-illuminant-weighted CIE or CIE-like color-matching functions and so that the performance of the device meets predetermined criteria.

Colorimeter on a Chip Using a Reflectance Mode Algorithm

FIG. 1 is a flow chart showing an exemplary embodiment of the method 100 for designing a colorimeter having integral illuminant-weighted CIE color-matching filters, including determining optimal colorant thicknesses. In the method 100, the following input 102 is received:

1) A set of Q colorant absorbance-per-unit-thickness transmission spectra, where Q is the number of different colorants available (e.g., Q=6, i.e., red, green, blue, cyan, magenta, and yellow colorants);
2) A photodetector spectral response function;
3) A colorimeter optics transmission spectra, e.g., ultraviolet (UV) and infrared (IR) filters);
4) A set of target CIE-like color-matching functions;
5) A spectral power distribution of a colorimeter illuminant;
6) A reference illuminant spectrum for calculation of L*, a*, and b* needed for the error measurement (ΔE) computation and for weighting the color-matching functions; and
7) Reflectance spectra to be used in optimization.

At 104, the method 100 determines the optimal colorant thicknesses in each channel and the optimum linear combinations of colorimeter illuminant spectrum weighted (CISW) channels that best match reference illuminant spectrum weighted (RISW) integral CIE color-matching filters. (See FIG. 2.)

In the method 100, the following output 106 is provided:

1) The number of channels, N, needed to match the CIE-like target functions;
2) The number of colorant layers needed per channel;
3) The type of colorant needed for each layer, e.g., red, green, blue, cyan, magenta, or yellow;
4) The thickness of each of the colorant layers;
5) A plot of the best-fit match to the target functions; and
6) The quantitative color difference between best-fit function, L*, a*, and b* values and target L*, a*, and b* values.

FIG. 2 shows more detail about how at 104 in FIG. 1, the optimal colorant thicknesses in each channel and the optimum linear combinations of CISW channels for integral RISW CIE color-matching filters are determined. At 200, a colorimeter that has a number of CISW channels, N, is considered, where a channel has at least one filter covering each detector (e.g., 3 filters cover each detector). The calculated absorptive filter is unique to that detector that contains a single or multiple layers of colorants and also an IR filter and a UV filter that cover all detectors. It is required that the linear combination of the N channels adds up to match a set of RISW CIE-like target color-matching functions to within a predetermined tolerance.

At 202, for each channel, the following is calculated.

1) The colorant needed for each layer;
2) The number of colorant layers needed;
3) The thickness of each of the colorant layers; and
4) The linear combination of CISW channels that best matches each RISW target CIE-like color-matching function.

At 204, the solution is constrained with the following conditions.

1) Prefer the solution with the minimum number of channels needed to acceptably match the RISW CIE-like target functions;

2) Prefer the solution with the minimum number of colorant layers per channel that does not increase the number of channels needed for an acceptable match to the target function; and 3) Prefer the solution that minimizes deviations in performance under the influence of layer thickness variations.

FIG. 3 is a flow chart showing even more detail than FIG. 2 about how at 104 in FIG. 1, the optimal colorant thicknesses in each channel and the optimum linear combinations of CISW channels that best matches RISW integral CIE color-matching filters are determined. At 300, the number of colorant layers allowed on any channel is set equal to an initial value of 1. At 302, it is determined whether the number of layers on any channel is greater than the predetermined constant, MaxLayerNum, (e.g., MaxLayerNum=4). If so, then control flows to 322, otherwise control flows to 304. At 304, the number of channels is set to an initial value of 3. At 306, it is determined whether the number of channels is greater than the predetermined constant, MaxChNum, (e.g., MaxChNum=6). If so, then control flows to 320, otherwise control flows to 308. At 308, it is determined whether all combinations of colorants and thicknesses have been tried on each channel. If so, control flows to 318, otherwise control flows to 310. At 310, a random initial condition is selected for the colorant type and layer thickness for each channel. At 312, an optimization is performed for colorant selection and layer thicknesses and channel coefficients to find the best CISW match to the RISW target color-matching functions. (See FIG. 4). At 314, ΔE values are computed for the test reflectance spectra. (See FIG. 5.) At 316, results are compared and stored for the computed configuration. (See FIG. 6.) At the bottom of the loop 304-318, the number of channels is increased by one and control flows from 318 back to the top of the loop at 306. At the bottom of the loop 300-320, the number of allowed layers on the channel is increased by one and control flows from 320 back to the top of the loop at 302. At 322, there is a test for layer thickness variation and a sort by a figure of merit value. (See FIG. 7.) At 324, the best configuration type and layer structure is selected. (See FIG. 8.)

FIG. 4 shows how the optimization at 312 in FIG. 3 is performed for colorant selection and layer thicknesses and channel coefficients to find the best CISW match to the RISW target color-matching functions. At 400, for all combinations of Q colorants, the following equation is solved.

$$\max_{c} \frac{[Trace(A^T L_v LDOM(M^T LDOLDOM + K_n)^{-1} M^T LDOL_v A]}{[Trace(A^T L_v L_v A)]} \quad (1)$$

where the color filter transmission matrix, $M=[m_1, \ldots, m_N]$ and $m_i=10^{-Hc_i}$, matrix H is the spectral densities of the colorants at maximum density, each column $c_i$ of matrix c is a vector comprising the thicknesses of all the colorant layers in channel i, the power operation is performed component-by-component, $L_v$ is the reference illuminant (used for RISW), and L is the colorimeter illumination (used for CISW). The component values of the thickness vectors $c_i$ are constrained to be greater than $c_{LL}$ and less than $c_{UL}$, where $c_{LL}$ is the lower limit of the layer thickness (e.g., 0.5 microns) and $c_{UL}$ is the upper limit of the layer thickness (e.g., 2.0 microns). Equation (1) optimizes the colorant layer thicknesses, c. In equation (1), the matrix A represents the target CIE-like color-matching functions, the matrix D represents the photodetector spectral response function, the matrix O represents the combined colorimeter optical element transmission functions, and the matrix $K_n$ represents an estimation of system noise covariance. At 402, subsequently, optimization s done to find the linear coefficients given by matrix B, that minimize the sum of the square residual values between the calculated CISW channel responses as functions of wavelength and the RISW target CIE-like color-matching functions.

FIG. 5 shows how at 314 in FIG. 3 ΔE is computed for the test reflectance spectra. At 500, for the new colorant layer structure (i.e., colorant layer type and thickness matrix c), the maximum and mean CIELAB ΔE for the spectral reflectances in the test reflectance set are computed. The ΔE value is between the L*, a*, and b* values obtained from the calculated best-fit color-matching functions and those values found using the target CIE-like functions. At 502, the L*, a*, and b* values are calculated using the reference illuminant spectrum.

Figure 6:
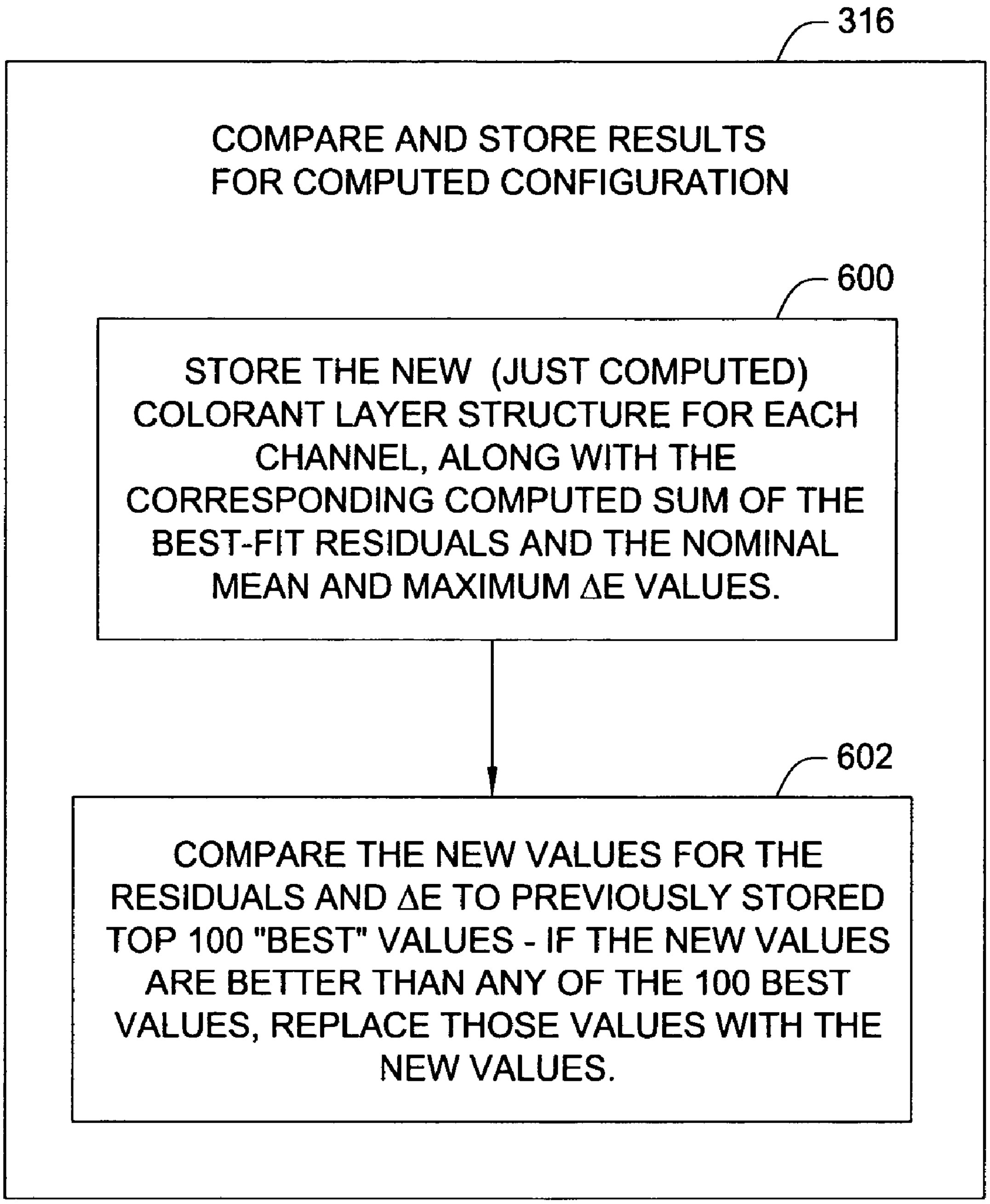

FIG. 6 shows how at 316 of FIG. 3 the results are compared and stored for the computed configuration. At 600, the new (just computed) colorant layer structure for each channel along with the corresponding computed sum of the best-fit residuals and the nominal mean and maximum ΔE values are stored. At 602, the new values for the residuals and ΔE are compared to a predetermined number of previously stored best values (e.g., the top 100). If the new values are better than any of the best values, those values are replaced with the new values.

FIG. 7 shows how the test at 322 of FIG. 3 is performed for layer thickness variation and how the sort by a figure of merit value is performed. At 700, for the best performing layer structures, the sensitivity to layer thickness variations is tested by computing the maximum and mean ΔE values, with each layer thickness having been increased and decreased by some variation tolerance (e.g., 0.1 microns). At 702, for a given number of channels, N, (e.g., N=3, 4, 5, 6) and a given number of filter layers (e.g., 1, 2, 3, or 4), the optimum layer structure is selected out for each configuration. For example, the optimum structure for a 4 channel configuration that allows up to 2 layers for each channel is selected out and the optimum structure for a 5 channel configuration that allows only a single layer for each channel is selected out, and so forth. At 704, the optimum layer structure is chosen by selecting the structure that was the least sensitive to layer thickness variations. This is done by sorting the results for the smallest maximum and mean ΔE values computed using the layer thickness variation test.

Figure 8:
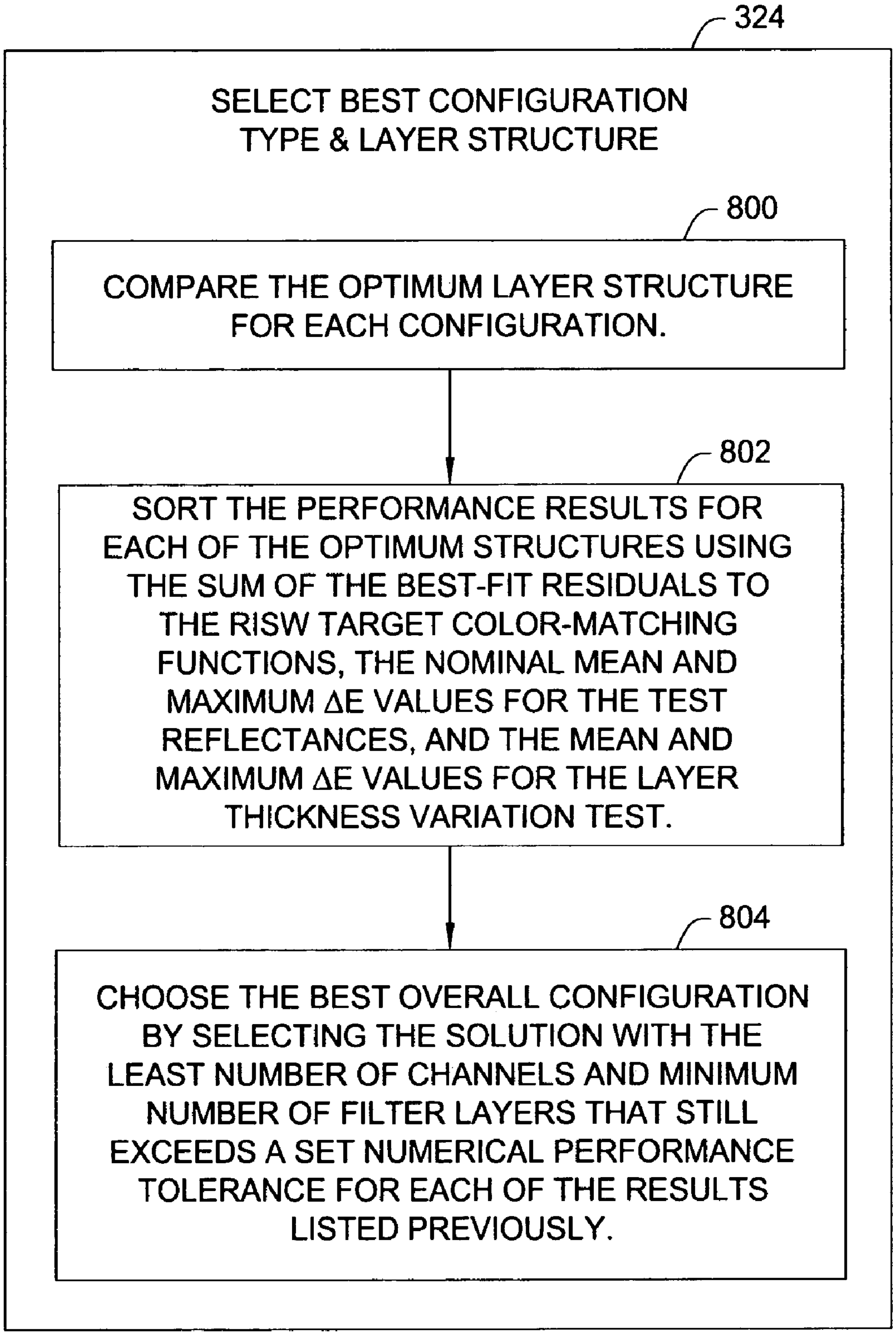

FIG. 8 shows how the selection at 324 of FIG. 3 is performed to select the best configuration type and layer structure. At 800, the optimum layer structure for each configuration is compared. At 802, the performance results for each of the optimum structures is sorted using the sum of the best-fit residuals to the RISW target color-matching functions, the nominal mean and maximum ΔE values for the test reflectances, and the mean and maximum ΔE values for the layer thickness variation test. At 804, the best overall configuration is chosen by selecting the solution with the least number of channels and minimum number of filter layers that still exceeds a set numerical performance tolerance for each of the results listed previously.

Figure 9:
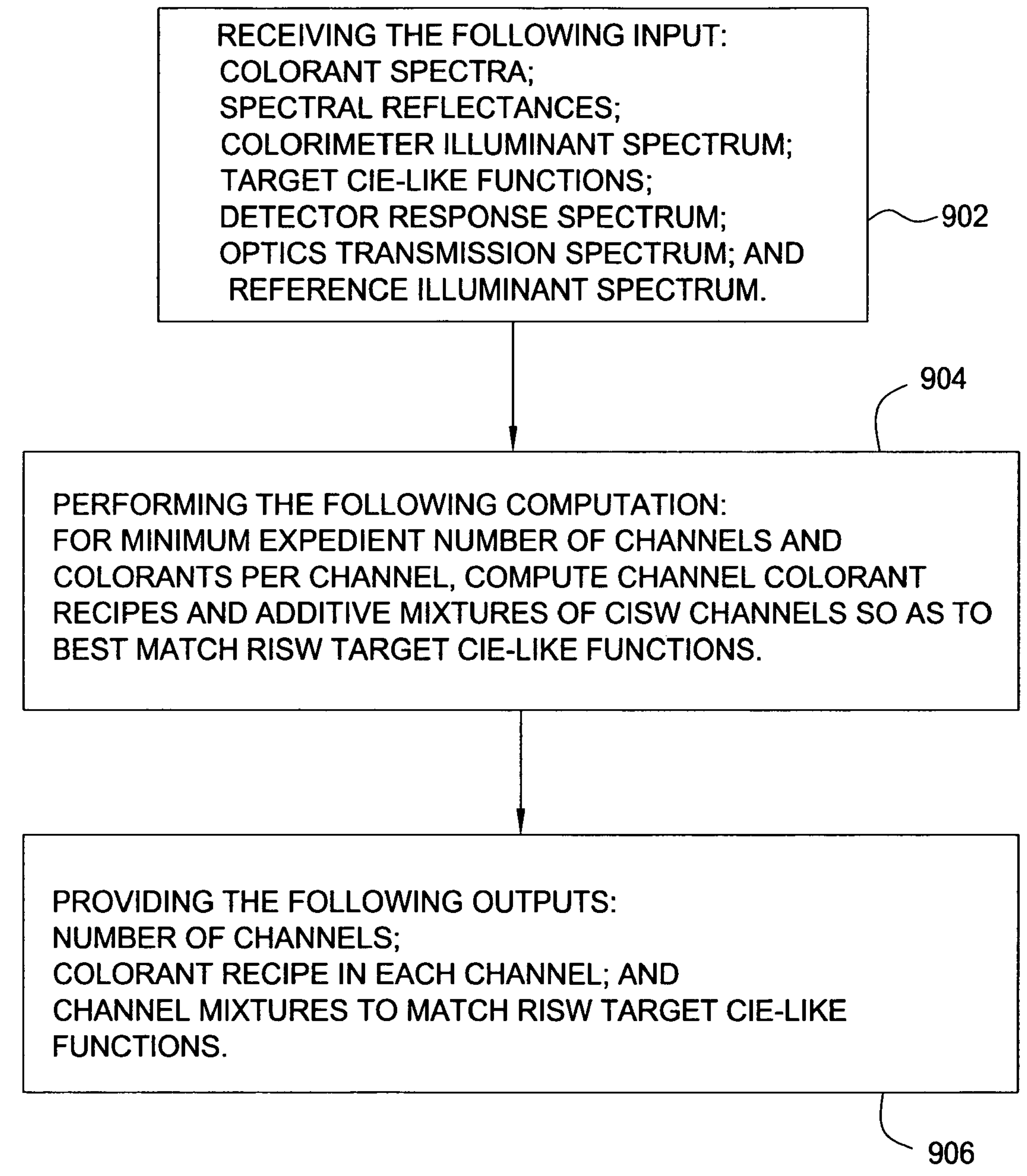
FIG. 9 is a flow chart showing an overview of another exemplary embodiment of the method for designing a colorimeter having integral illuminant-weighted CIE color-matching filters.

FIG. 9 shows an overview of another exemplary embodiment of the method for designing a colorimeter having integral illuminant-weighted CIE color-matching filters, including determining optimal colorant thicknesses. This embodiment can be used to design a colorimeter on a chip using a reflectance mode algorithm. The method 900 receives the following input 902: colorant spectra, spectral reflectances, colorimeter illuminant spectrum, target CIE-like functions, a detector response spectrum, an optics transmission spectrum, and a reference illuminant spectrum. At 904, the channel colorant recipes and additive mixtures of CISW channels are computed so as to best match RISW target CIE-like functions for a minimum expedient number of channels and colorants per channel. The method 900 provides the following output 906: a number of channels, the colorant recipe in each channel, and the channel mixtures to match the RISW target CIE-like functions.

FIG. 10 shows more detail and exemplary values for how at 904 in FIG. 1, the channel colorant recipes and additive mixtures of CISW channels are computed so as to best match RISW target CIE-like functions for a minimum expedient number of channels and colorants per channel. More specifically, the method 900 receives the following input 902: a number, N, colorant spectra (absorbance per unit thickness at P wavelengths), an ensemble of spectral reflectances, a colorimeter illuminant spectrum, a 3×P matrix of CIE-like functions xbar, ybar, zbar at P wavelengths, an optics transmission spectrum O, and a reference illuminant spectrum. More specifically, at 904, there is a computation having three loops, loop I 1000, loop II 1002, and loop III 1004. Loop I 1000 repeats for the maximum number of colorants per channel, loop II 1002 repeats for the number of channels, and loop III 1004 repeats for all the combinations of colorants in all the channels. Inside loop III 1004, the following step are performed:

1) Optimize fit of thickness recipes in all CISW channels to RISW CIE-like function space;
2) Optimize CISW channel combinations to approximate RISW CIE-like X Y Z functions;
3) Compute ancillary metrics for goodness of fit; and
4) Store loop state.

Continuing at 904 outside the loops, the method 900 compares the optima of all the loop states (I, II, III) to find the best one and writes the following output 906: the number of channels, N, the thickness recipes of colorants in each channel, and the matrix of linear coefficients from CISW channels to RISW CIE XYZ.

Figure 11:
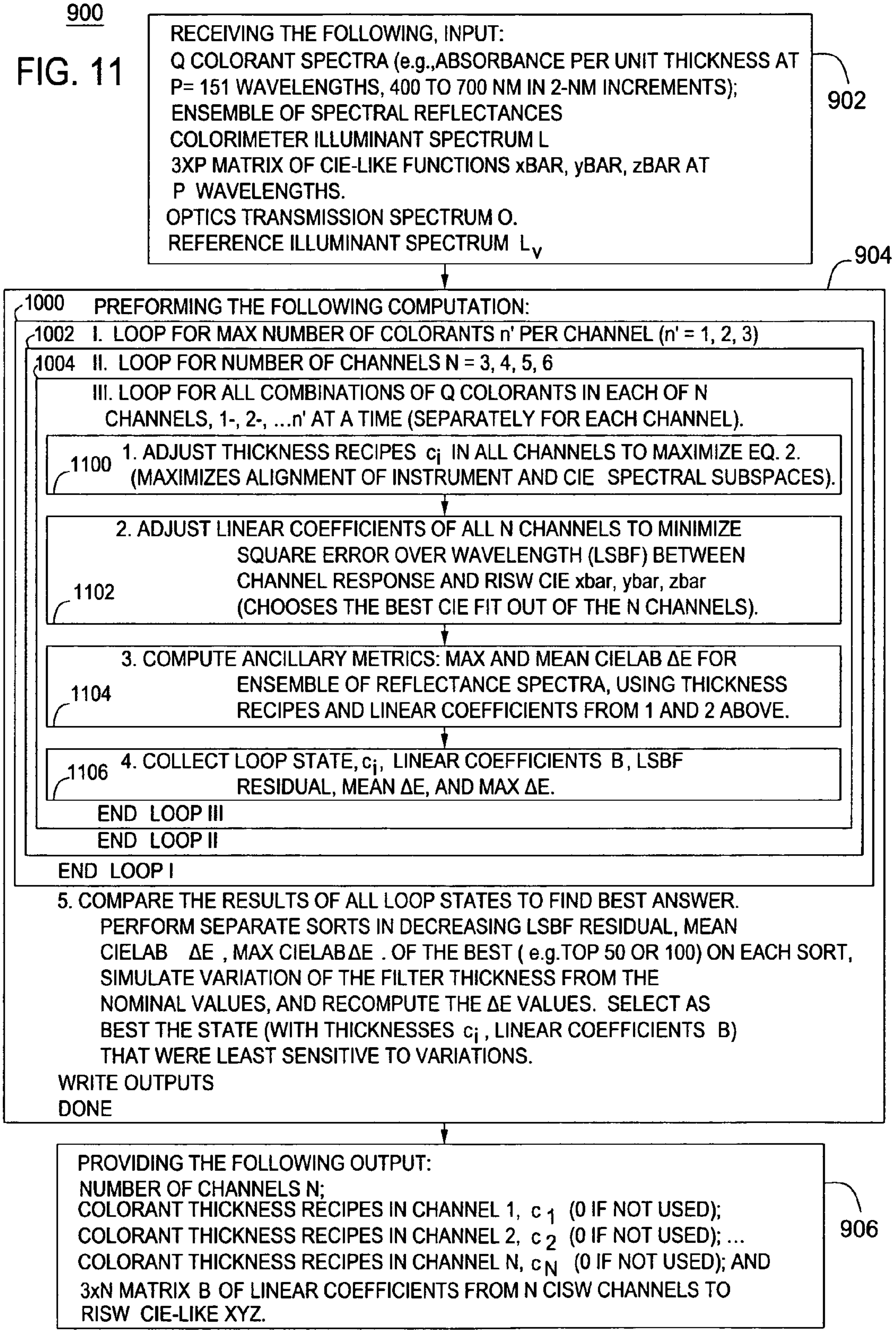

FIG. 11 shows the exemplary method 900 of FIGS. 9 and 10 in yet more detail and with additional exemplary values. The method 900 receives the following input 902: Q colorant spectra (e.g., absorbance per unit thickness at P=151 wavelengths, 400 to 700 nm in 2-nm increments), an ensemble of spectral reflectances $S_k$, colorimeter illuminant spectrum L, a 3×P matrix of CIE-like functions xbar, ybar, zbar at P wavelengths, an optics transmission spectrum O, and a reference illuminant spectrum $L_v$.

At 904, the method 900 performs a computation involving loop I 1000, loop II 1002, and loop III 1004, and then (outside the loops) compares the results of all the loop states to find the best answer. Separate sorts are performed in decreasing LSBF residual, mean CIELAB ΔE, and maximum CIELAB ΔE. Of the best (e.g., the best 50 or 100) on each sort, the variation of the filter thickness from the nominal values is simulated and the ΔE values are recomputed. The best state (with thicknesses $c_i$ and linear coefficients B) that was least sensitive to variation is selected and the output is written at 906. This book-keeping can also be done cumulatively inside loop III 1004, after step 4 1106. At 906, the following output is provided: the number of channels N, the colorant thickness recipe in channel i, $c_i$ (which is 0 if not used) for i=1 . . . N and a 3×N matrix B of linear coefficients from N CISW channels to RISW CIE-like XYZ.

Loop I 1000 repeats for the maximum number of colorants n' per channel (e.g., n'=1, 2, 3). Loop II 1002 repeats for the number of channels N, (e.g., N=3, 4, 5, 6). Loop III 1004 repeats for all combinations of Q colorants in each of N channels 1-, 2-, . . . , n' at a time separately for each channel. Inside Loop III 1004, the following steps are performed.

1) At 1100, adjust the thickness recipes $c_i$ in all channels to maximize the following equation (a repeat of Eq. 1), which maximizes alignment of instrument and CIE spectral subspaces.

$$\max_c \frac{\left[Trace\left(A^T L_v LDOM(M^T LDOLDOM + K_n)^{-1} M^T LDOL_v A\right]\right.}{Trace[A^T L_v L_v A]} \tag{1}$$

2) At 1102, adjust linear coefficients of all N channels to minimize square error over wavelength (LSBF) between channel response and RISW CIE xbar, ybar, zbar, which chooses the best CIE fit out of the N channels.
3) At 1104, compute ancillary metrics: max and mean CIELAB ΔE for ensemble of reflectance spectra using thickness recipes and linear coefficients from steps 1 and 2.
4) At 1106, Collect loop state, $c_i$, linear coefficients B, LSBF residual, mean ΔE, and max ΔE.

Figure 12:
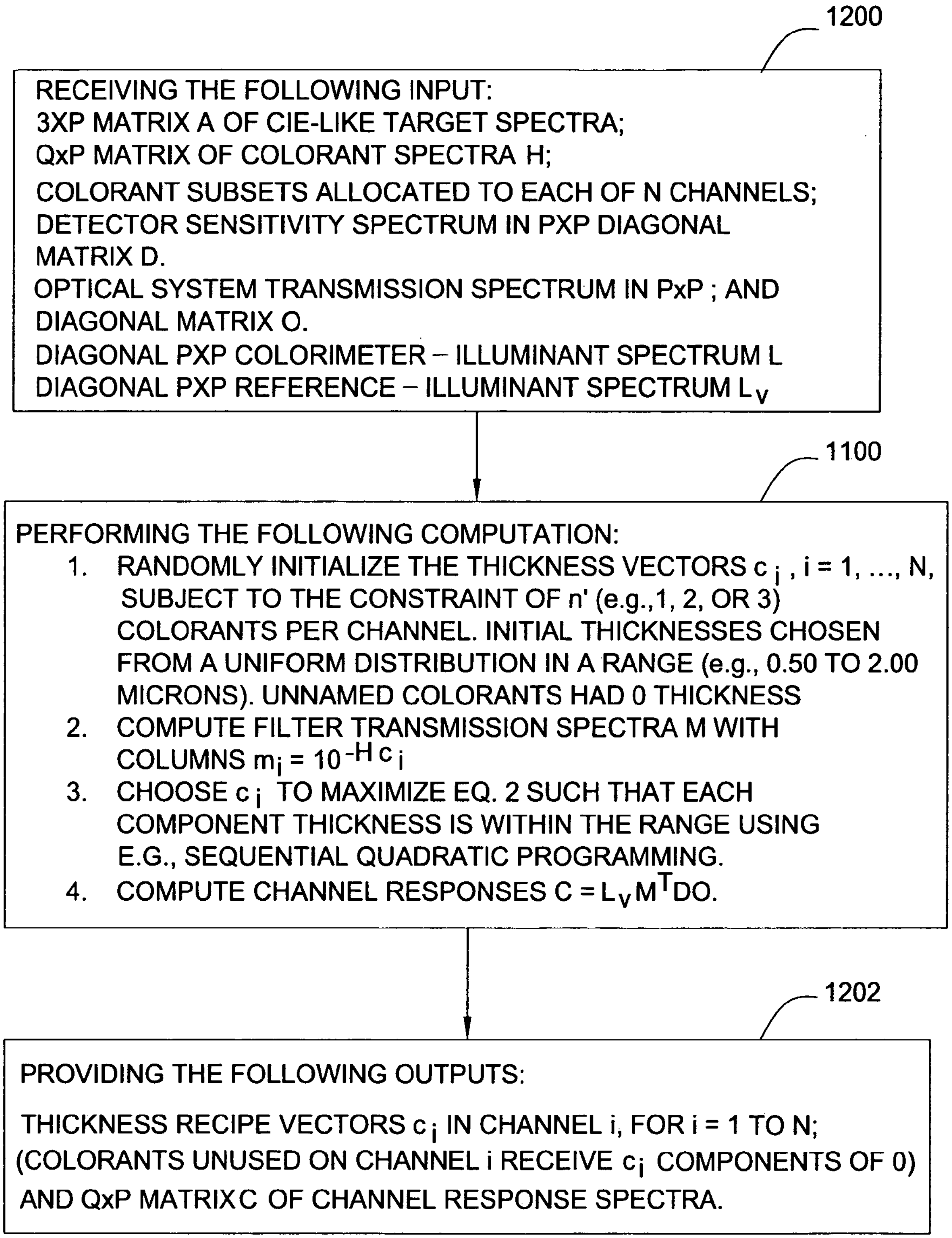

FIG. 12 shows more detail of how at step 1100 inside loop III 1004 (shown in FIG. 11) the thickness recipes are adjusted in all channels to maximize equation 2. The intermediate input 1200 to step 1100 includes the 3×P matrix A of CIE-like target spectra, the Q×P matrix of colorant spectra H, colorant subsets allocated to each of N channels, a detector sensitivity spectrum in a P×P diagonal matrix D, an optical system transmission spectrum in a P×P diagonal matrix O, diagonal P×P colorimeter illuminant spectrum L, and diagonal P×P reference illuminant spectrum $L_v$. The computation at 1100 is as follows.

1) Randomly initialize the thickness vectors $c_i$, for i=1, . . . , N, subject to the constraint of n' (e.g., 1, 2, or 3) colorants per channel. Initial thicknesses chosen from a uniform distribution in a range, such as about 0.5 to 3 microns.
2) Compute filter transmission spectra M with columns $m_i=10^{-Hc_i}$
3) Choose $c_i$ to maximize equation (2) such that each component thickness is within the range using, for example, sequential quadratic programming.
4) Compute channel responses $C=L_v M^T DO$.

The output 1202 of computation 1100 inside loop III 1004 includes the thickness recipe vectors $c_i$ in channel i, for i=1 to N. Colorants unused on channel i receive $c_i$ components of 0. Also output is the N×P matrix C of the channel response spectra. These outputs are intermediate.

Figure 13:
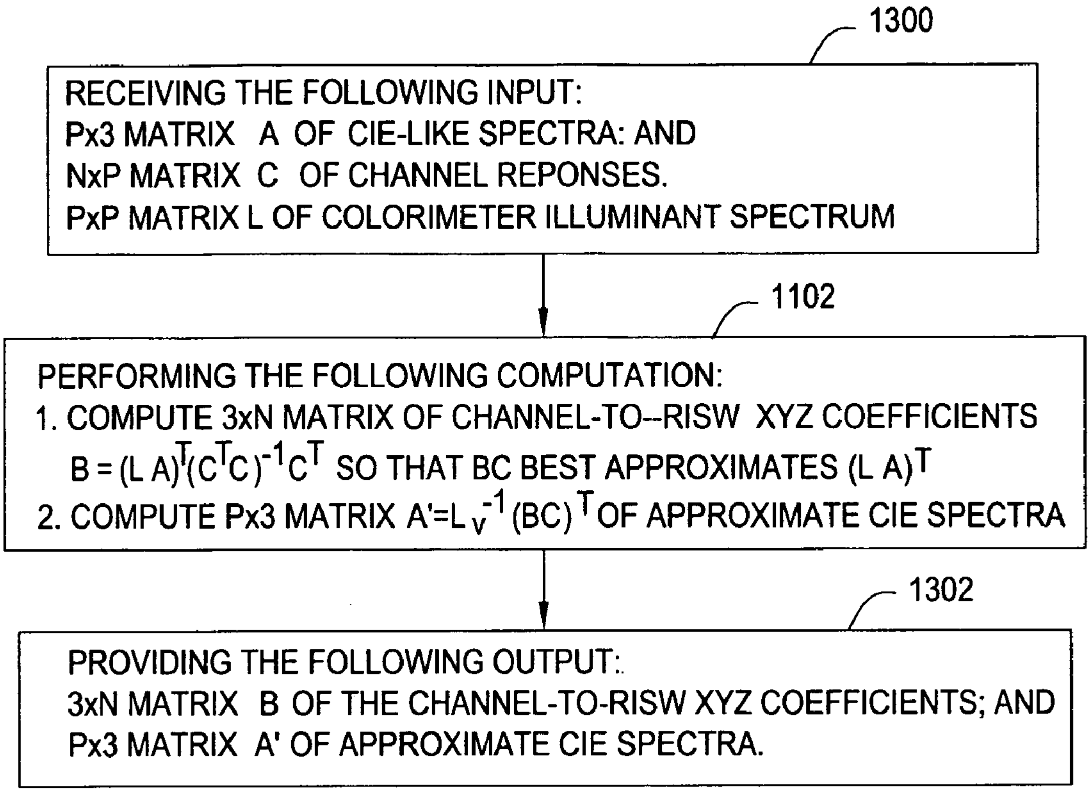

FIG. 13 shows more detail of how at step 1102 inside loop III 1004 (shown in FIG. 11) linear coefficients of all N channels are adjusted to minimize square error over wavelength (LSBF) between the combined channel response and RISW CIE-like target functions, which chooses the best fit out of the N channels. The intermediate input 1300 includes the P×3 matrix A of CIE-like spectra, the N×P matrix C of channel responses, and the P×P matrix L of colorimeter illuminant spectrum. The computation 1102 includes the following steps.

1) Compute 3×N matrix of channel-to-RISW XYZ coefficients $B=(LA)^T(C^TC)^{-1}C^T$ so that BC best approximates $(LA)^T$.
2) Compute P×3 matrix $A'=L_v^{-1}(BC)^T$ of approximate CIE spectra.

The intermediate outputs 1302 include the 3×N matrix B of channel-to-RISW XYZ coefficients and the P×3 matrix A' of approximate CIE spectra.

FIG. 14 shows more detail of how at step 1104 inside loop III 1004 (shown in FIG. 11) to compute ancillary metrics: maximum and mean CIELAB ΔE for ensemble of reflectance spectra, using thickness recipes and linear coefficients. The intermediate input 1400 includes a P×1 reflectance spectra $S_k$, a P×3 matrix A (i.e., target xbar, ybar, zbar spectra), a P×3 matrix A' (i.e., approximate xbar, ybar, zbar spectra), a P×1 default reference illuminant spectrum $L_v$ (e.g., CIE D50 or D65), and a column P-vector 1 of ones. The computation 1104 includes the following steps, which include an inner loop IV 1106 for each reflectance spectrum $S_k$ (e.g., from a color atlas).

1) Compute reference white CIE XYZ: $(X_n,Y_n,Z_n)^T=A^TL_v1$.
2) Compute reference white approximate XYZ: $(X'_n,Y'_n,Z'_n)^T=A'^TL1$.

Loop IV 1106, for each reflectance spectrum $S_k$:

3) Compute true CIE X,Y,Z of spectrum: $(X,Y,Z)^T=A^TL_vS_k$.
4) Compute approximate CIE X,Y,Z of spectrum: $(X',Y',Z')=A'^TLS_k$.
5) Transform (X,Y,Z) to CIELAB (L*, a*, b*) with parameters $(X_n,Y_n,Z_n)$
   $L^*=116f(Y/Y_n)-16$
   $a^*=500[f(X/X_n)-f(Y/Y_n)]$
   $b^*=200[f(Y/Y_n)-f(Z/Z_n)]$
   where $f(q)=q^{1/3}$ for $q>0.008856$, else $f(q)=7.787q+16/116$.
6) Transform (X',Y',Z') to (L'*,a'*,b'*) with parameters $(X'_n,Y'_n,Z'_n)$:
   $L'^*=116f(Y'/Y_n)-16$
   $a^*=500[f(X'/X'_n)-f(Y'/Y'_n)]$
   $b^*=200[f(Y'/Y'_n)-f(Z'/Z'_n)]$
   where $f(q)=q^{1/3}$ for $q>0.008856$, else $f(q)=7.787q+16/116$.
7) Compute $\Delta E_k=[(L^*-L'^*)^2+(a^*-a'^*)^2+(b^*-b'^*)]^{1/2}$ End Loop IV.

8) Compute MeanΔE=mean$\Delta E_k$ and MaxΔE=$\max_k\{\Delta E_k\}$.

The intermediate output 1402 includes MeanΔE and MaxΔE.

FIG. 15 shows more detail of the how at step 1106 inside loop III 1004 (shown in FIG. 11) to compare the optima of all loop states to find the best one. The intermediate input 1500 includes tabulated records, each containing the following: N, n', channel, colorant combinations, LSBF residual, mean CIELAB ΔE, max CIELAB ΔE, thickness recipes $c_i$, and coefficient matrix B. The computation 1106 includes the following steps.

1) Separately sort records in decreasing LSBF residual, mean CIELAB ΔE, max CIELAB ΔE.
2) Of the best (e.g., 50 or 100) on each sort, simulate variation of the filter thickness from the nominal values and recomputed the ΔE values.
3) Select as best the record least sensitive to variations.

The intermediate output 1502 includes the winning record, containing the following: N, n', channel colorant combinations, LSBF residual, mean CIELAB ΔE, max CIELAB ΔE, thickness recipes $c_i$, and coefficient matrix B.

Computational Study: Printer Colorimeter Design

The spectral sensitivity of a colorimeter is modeled using a vector space notation, where the visible spectrum is sampled at P wavelengths. An N band system is modeled as $$m=M^TLDOr+n \tag{2}$$

where m is an N element vector that represents the measurement of each band of the instrument, M is a P×N matrix with elements that represent the spectral transmission of the N filters, L is a P×P diagonal matrix that represents the spectral power distribution of the device illumination, D is a P×P diagonal matrix that represents the spectral sensitivity of the detector(s), O is a P×P diagonal matrix that represents the combined spectral transmission of various optical elements in the device (e.g., diffuser, IR filter, etc.), r is a P element vector that represents the reflectance spectrum under measurement, and n is additive noise.

The colorimeter is configured to provide accurate colorimetric measurements of the reflectance spectrum r. Using the vector space notation, the CIEXYZ value of the reflectance spectrum r is denoted by $$t=A^TL_vr \tag{3}$$

where A is a P×3 matrix that represents the CIEXYZ color matching functions, and $L_v$ is the reference illuminant under which the measurements are desired (e.g., D50 or D56).

There is not complete freedom in the selection of the matrix M. Instead, selection of the matrix M is bounded by the use of filter colorants that can be layered at a specified range of densities. The relationship between a filter transmission in the matrix $M=[m_1, \ldots, m_N]$ and the density of the material is nonlinear and approximated by Beer's law, which is given by $$m_i=10^{-Hc_i} \tag{4}$$

where H is a matrix having columns representing the spectral densities of the colorants at maximum density, i is the channel index, $m_i$ is a column P vector, $c_i$ is a vector that represents the thickness of each dye layer, and the power operation is performed element wise upon the vector $-Hc_i$.

In method 100, a goal is to determine the optimal vector c constrained by manufacturability constraints. Due to the nonlinear nature of the problems, solutions are determined numerically. An iterative method solves this problem using an approach as follows.

A. Select a random initial condition for the colorant concentration.
B. For a given initial condition, solve the following optimization problem $$\max_c \frac{[Trace(A^TL_vLDOM(M^TLDOLDOM+K_n)^{-1}M^TLDOL_vA]}{[Trace(A^TL_vL_vA)]} \tag{1}$$

where M depends upon c as given in equation (3), c is constrained between about [0,3] and $K_n$ is the noise covariance matrix. This quantity is a measure of the overlap between the subspace spanned by the filters and the subspace spanned by the color-matching functions.

C. Clip to zero, values of c that are less than about 0.5 microns.
D. If a maximum number of iterations have not been reached and the clipping amount was significant, then set initial conditions to the clipped output and repeat step B.

E. Test filter performance in terms of least-squares fit, maximum and average ΔE on an ensemble of reflectance spectra and in terms of average and maximum ΔE with filter coating variations of about ±0.1 microns.

F. If filter is better than others tested, then save it.

G. Return to step A until N random initial conditions have been run.

Figure 16:
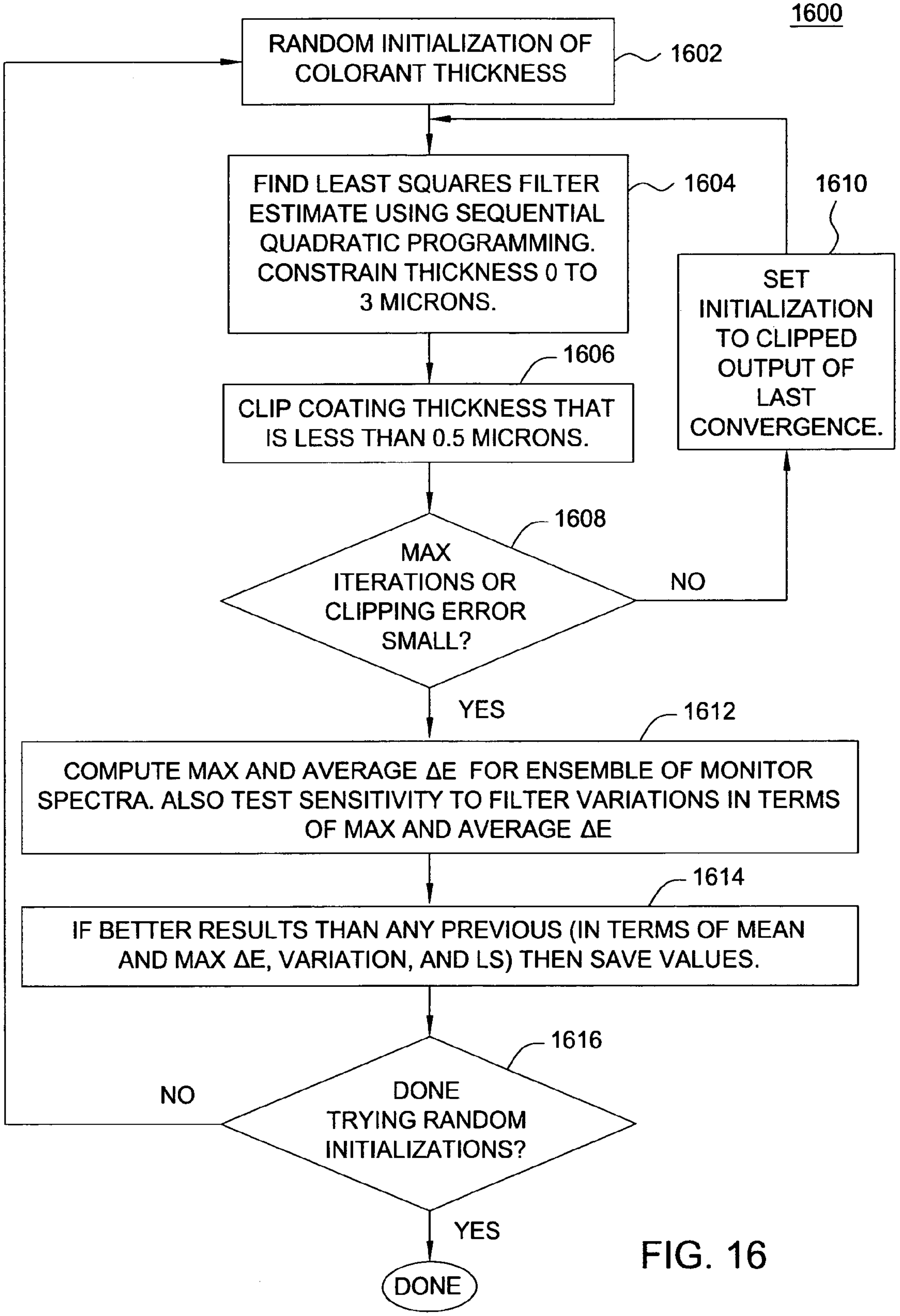
FIG. 16 is a flow diagram showing an overview of yet another exemplary embodiment of the method for designing a colorimeter having integral illuminant-weighted CIE color-matching filters.

FIG. 16 is a flow diagram showing an overview of yet another exemplary embodiment of the method 1600 for determining optimal colorant thicknesses for integral illuminant-weighted CIE color-matching filters. This method 1600 was used in the computational study to solve for the dye densities necessary to obtain the best approximation to the RISW CIE color-matching functions for a fixed number of channels. However, the present invention includes methods for determining optimal colorant thicknesses for integral illuminant-weighted CIE color-matching filters, which solve a more general design problem than that of the computational study.

This method 1600 was used to determine the following.

8) How to use a given set of filter functions to generate reasonable CIE color-matching functions;

9) The minimum number of filter and detector channels needed to minimize cost;

10) The thickness of each filter layer;

11) Expected performance from the sensor; and

12) How to vary the filter functions to get satisfactory performance and match to the CIE functions.

The approach was as follows.

1) At 1602, select a random initial condition for the colorant concentration (thickness).

2) At 1604, for the given initial conditions, solve the following optimization problem.

$$\max_{c} \frac{\left[Trace\left(A^T L_v LDOM\left(M^T LDOLDOM + K_n\right)^{-1} M^T LDOL_v A\right]}{\left[Trace\left(A^T L_v L_v A\right)\right]} \qquad (1)$$

In equation (1), M depends upon c, c is constrained between [0,3], and $K_n$ is the noise covariance matrix. This quantity is a measure of the overlap between the subspace spanned by the filters and the subspace spanned by the RISW color-matching functions (CMFs).

3) At 1606, clip to zero, values of c that are less than about 0.5 microns.

4) At 1608, if the maximum number of iterations is not reached and the clipping amount was significant, then set the initial conditions to the clipped output (at 1610) and repeat step 2 (1604).

5) At 1612, test the filter performance in terms of a least squares fit, maximum and average ΔE on an ensemble of reflectance spectra and in terms of average and maximum ΔE with filter coasting variations of 10.1 microns.

6) At 1614, if the filter is better than the other tested, and then save it.

7) At 1616, return to step 1 (1602) until N random initial conditions are run.

The method 1600 addresses the problem of variation to initial conditions by using a variety of starting points and saving the best results. The problem of the solution set not being continuous is addressed by using iterations.

It is known that multiple coatings of filters increase the cost of the device. Placing a constraint on the number of coatings is a useful technique for simplifying the optimization problem. It was determined that by limiting the number of coatings to one and two coatings, the sensitivity to initial conditions was no longer found to be a significant problem. In addition, it was possible to search all the various one and two coating combinations, maximizing the cost function of equation (8).

Computational Study Results

In a computational study, to assess the feasibility of a reflectance device according to the present invention, each possible double coated filter combination was optimized for filter sets sizes 4 and 5. A linear estimator was used to map from the recorded values to CIEXYZ values. The estimator used a priori knowledge of the reflectance spectra being measured. The filter set that provided the maximum values for equation (4) was then selected.

Figure 17:
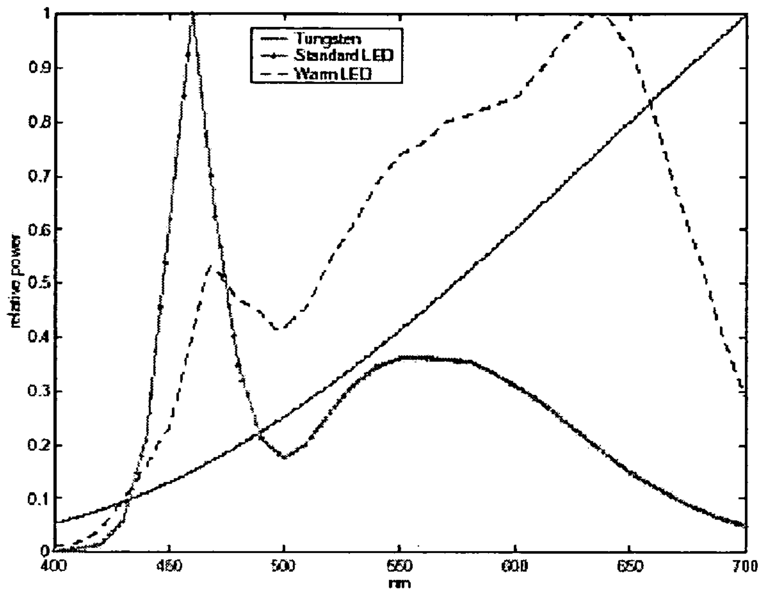
FIG. 17 is a chart showing the spectral power distributions for some exemplary illuminants.

FIG. 17 is a chart showing the spectral power distributions for some exemplary colorimeter illuminants, (e.g., tungsten, standard white LED, warm white LED). As illustrated, the results for the standard white LED spectrum were poor due to the extreme spectral variation of the source. For this reason and to reduce the amount of data presented, the remainder of this description will concentrate on the tungsten and warm white LED sources.

Figure 18:
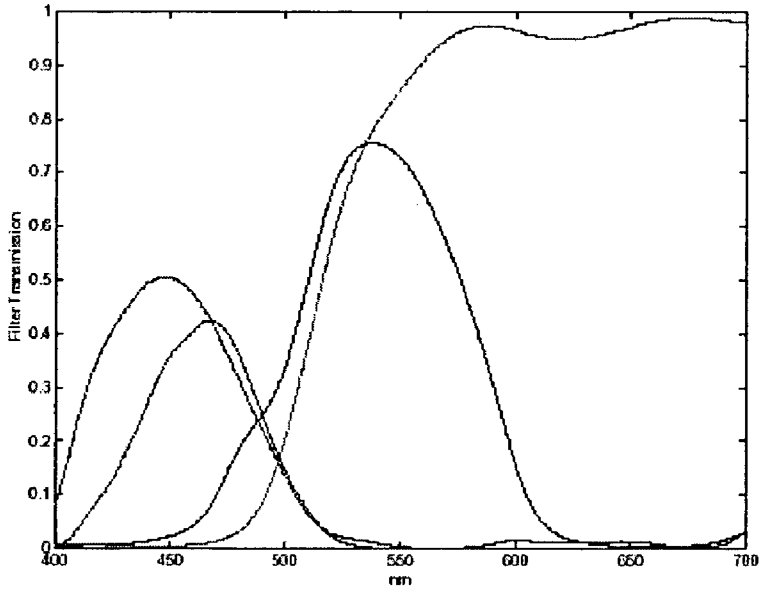
FIG. 18 is a chart showing four double-coated filter transmittances for use with a warm white light-emitting diode (LED) in the computational study.
Figure 19:
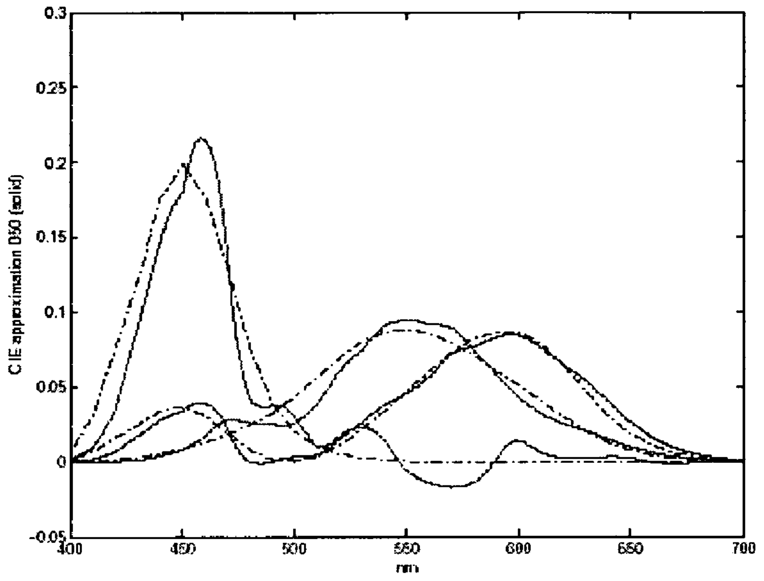
FIG. 19 is a chart showing D65 CIEXYZ functions (dotted and dashed curves) with approximations by the four filters in FIG. 18, weighted by the warm white LED spectrum (solid curves) in the computational study.
Figure 20:
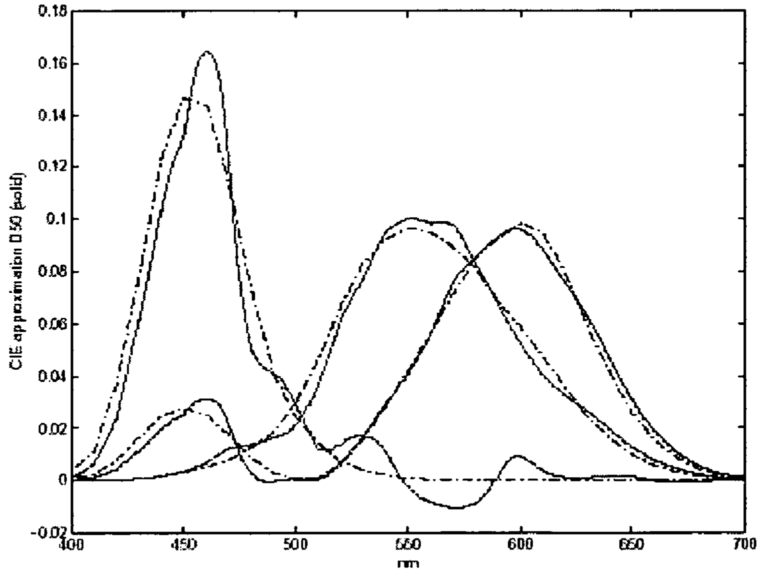
FIG. 20 is a chart showing D50 CIEXYZ functions (dotted and dashed curves) with approximation by the four filters in FIG. 18, weighted by the warm white LED (solid curves) in the computational study.
Figure 21:
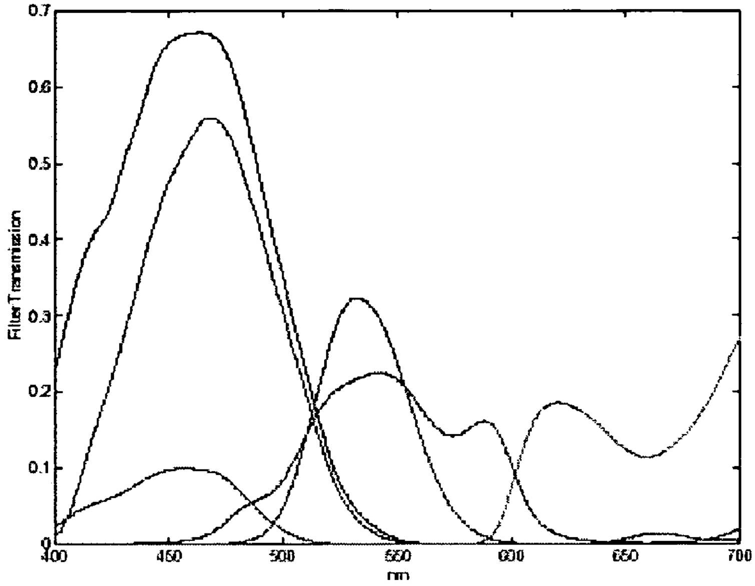
FIG. 21 is a chart showing transmittances of five double-coated filter for use with the warm white LED in the computational study.
Figure 22:
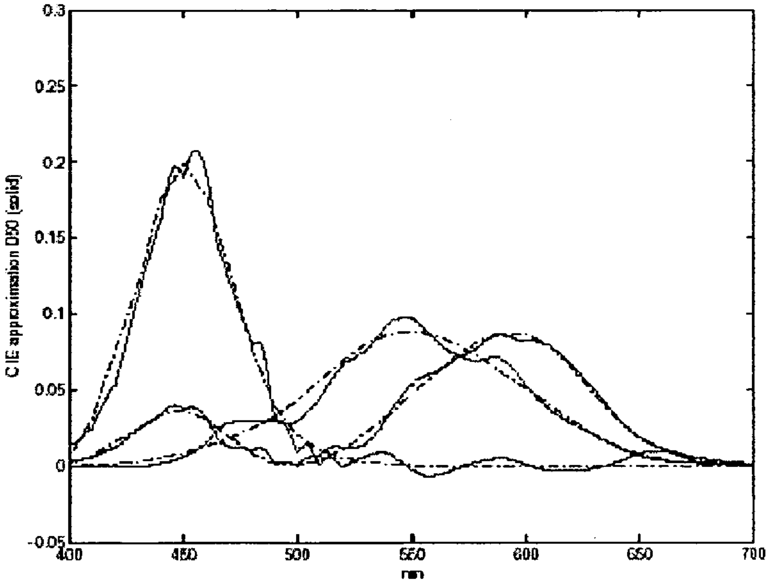
FIG. 22 is a chart showing D65 CIEXYZ functions (dotted and dashed curves) with approximations by the five filters in FIG. 21, weighted by the warm white LED (solid curves) in the computational study.
Figure 23:
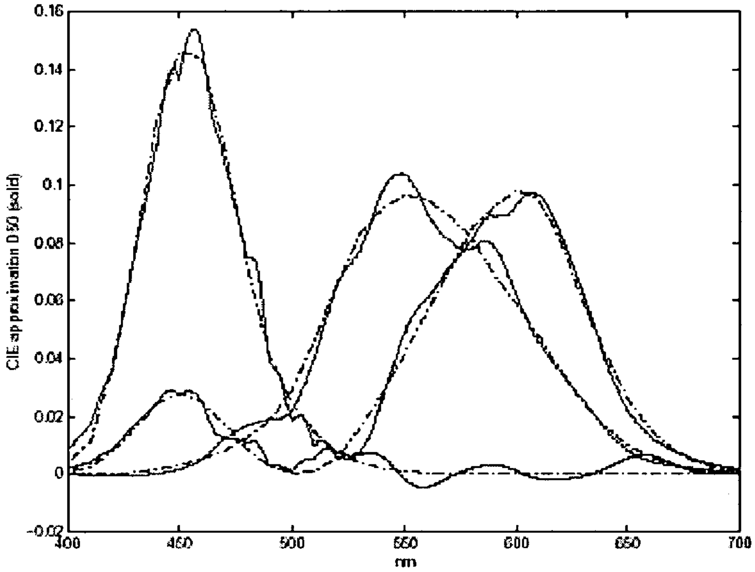
FIG. 23 is a chart showing D50 CIEXYZ functions (dotted and dashed curves) with approximations by five filters in FIG. 21, weighted by the warm white LED (solid curves) in the computational study.
Figure 24:
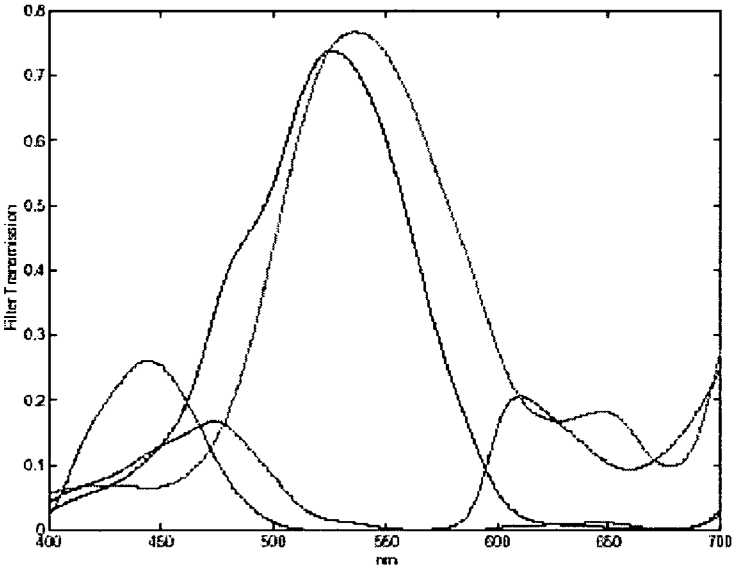
FIG. 24 is a chart showing transmittances of four double-coated filters for use with a 2900K tungsten source in the computational study.
Figure 25:
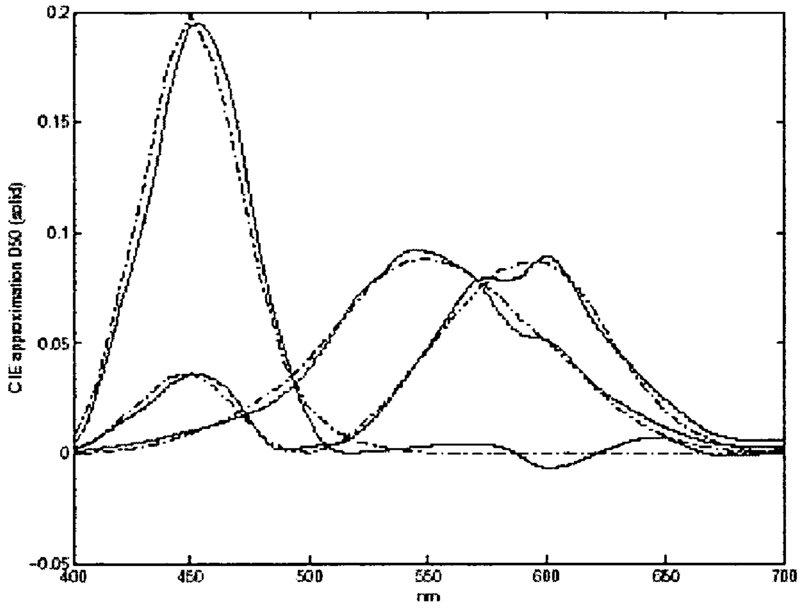
FIG. 25 is a chart showing D65 CIEXYZ functions (dotted and dashed curves) with approximations by the four filters in FIG. 24, weighted by the 2900K tungsten source (solid curves) in the computational study.
Figure 26:
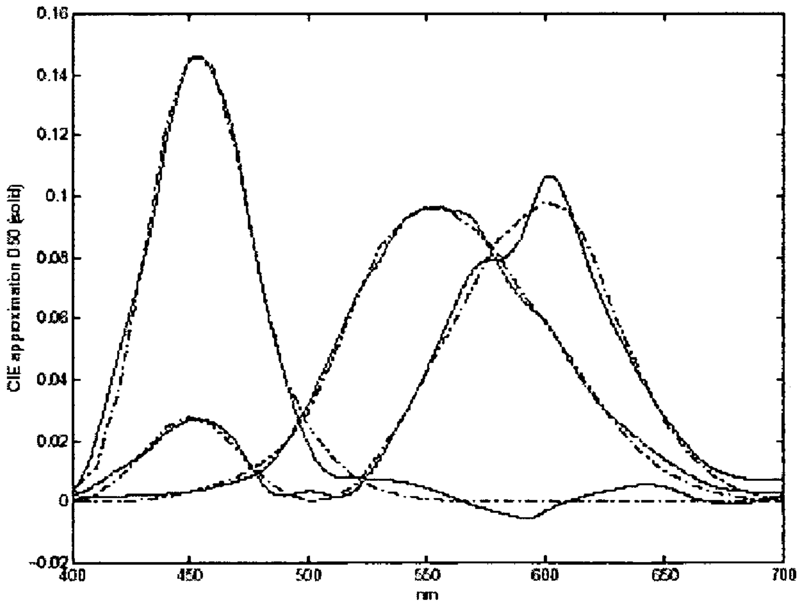
FIG. 26 is a chart showing D50 CIEXYZ functions (dotted and dashed curves) with approximations by the four filters in FIG. 24, weighted by the 2900K tungsten source (solid curves) in the computational study.
Figure 27:
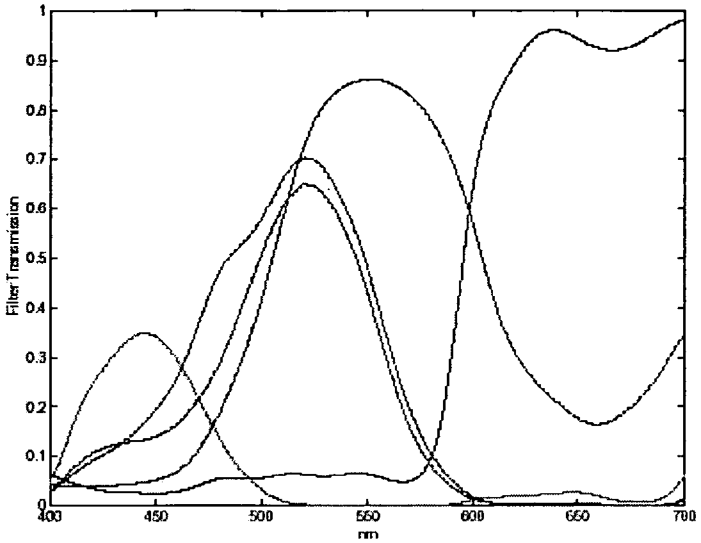
FIG. 27 is a chart showing transmittances of five double-coated filters for use with the 2900K tungsten source in the computational study.
Figure 28:
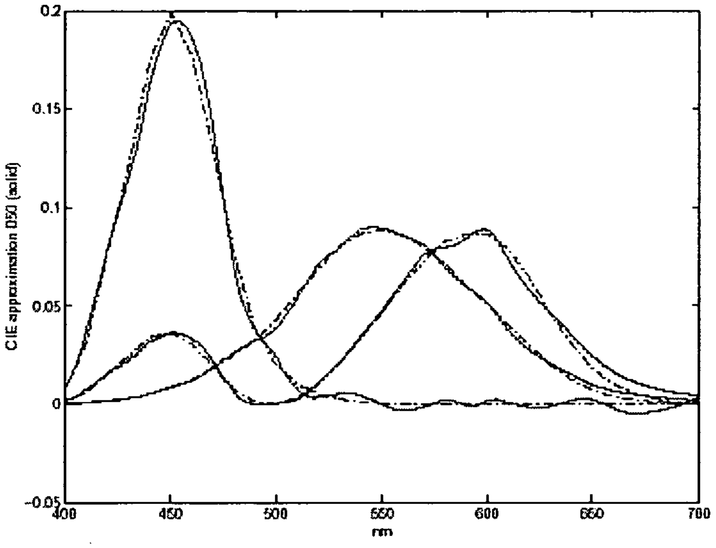
FIG. 28 is a chart showing D65 CIEXYZ functions (dotted and dashed curves) with approximations by the five filters in FIG. 27, weighted by the 2900K tungsten source (solid curves) in the computational study.
Figure 29:
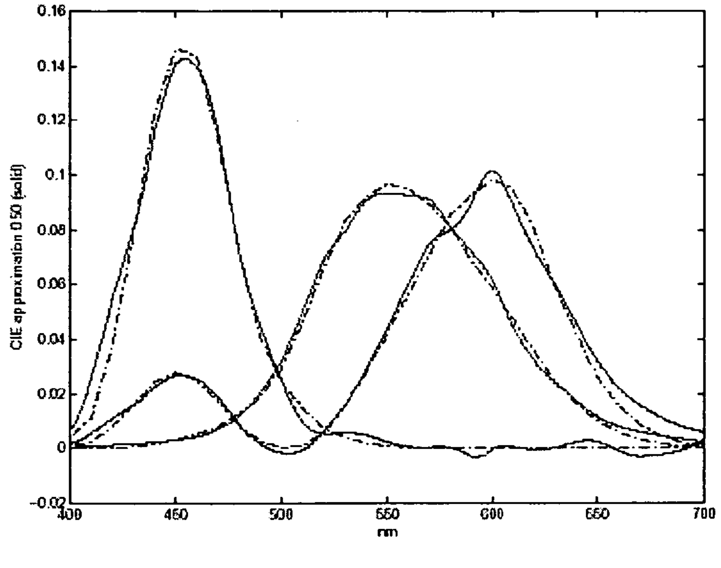
FIG. 29 is a chart showing D50 CIEXYZ functions (dotted and dashed curves) with approximations by the five filters in FIG. 27, weighted by the 2900K tungsten source (solid curves) in the computational study.

FIGS. 18-29 display various filter transmittances and their approximation of the CIEXYZ color matching functions. Specifically, FIGS. 18-20 are charts illustrating the transmittances and illuminant-weighted color matching function approximations for four filters for use with warm white LEDs, FIGS. 21-23 are charts illustrating the transmittances and weighted color matching function approximations for five filters for use with warm white LEDs, FIGS. 24-26 are charts illustrating the transmittances and weighted color matching function approximations for four filters for use with a 2900K tungsten source, and FIGS. 27-29 are charts illustrating the transmittances and weighted color matching function approximations for five filters for use with a 2900K tungsten source.

FIGS. 30-35 shows tables, which summarize the calorimetric performances of the filters using the projection and linear minimum mean square error (LMMSE) transformation methods. The coating thickness values for the filter sets are given in the tables shown in FIGS. 34 and 35. Nominal $\Delta E_{max}$ is the maximum ΔE value across an ensemble of reflectance spectra for the filter set with its specified coating. Nominal $\Delta E_{avg}$ is the average ΔE value across an ensemble of reflectance spectra for the filter set with its specified coating. Deviation $MAX\Delta E_{max}$ is the maximum ΔE value across an ensemble of reflectance spectra for the filter set with all ±0.1 micron variations from the specified coating. Deviation $MAX\Delta E_{avg}$ is the maximum taken across all ±0.1 micron variations from the specified coating of the average ΔE value across an ensemble of reflectance spectra.

Based upon this data, a tungsten source or a warm white LED source can be implemented to design a good reflectance colorimeter with these colorants. A concern with the tungsten source is the low power levels in the blue portion of the spectrum as well as concerns about power consumption, if the device were powered via USB or even battery. The low signal level in the blue region is the reason for the relatively high signal-to-noise ratios (SNR) that were used in the simulation. The SNR as reported was computed as an average SNR across the channels. Hence, the SNR in the blue end of the spectrum is lower than indicated in the table and the SNR in the red end is higher.

Figure 36:
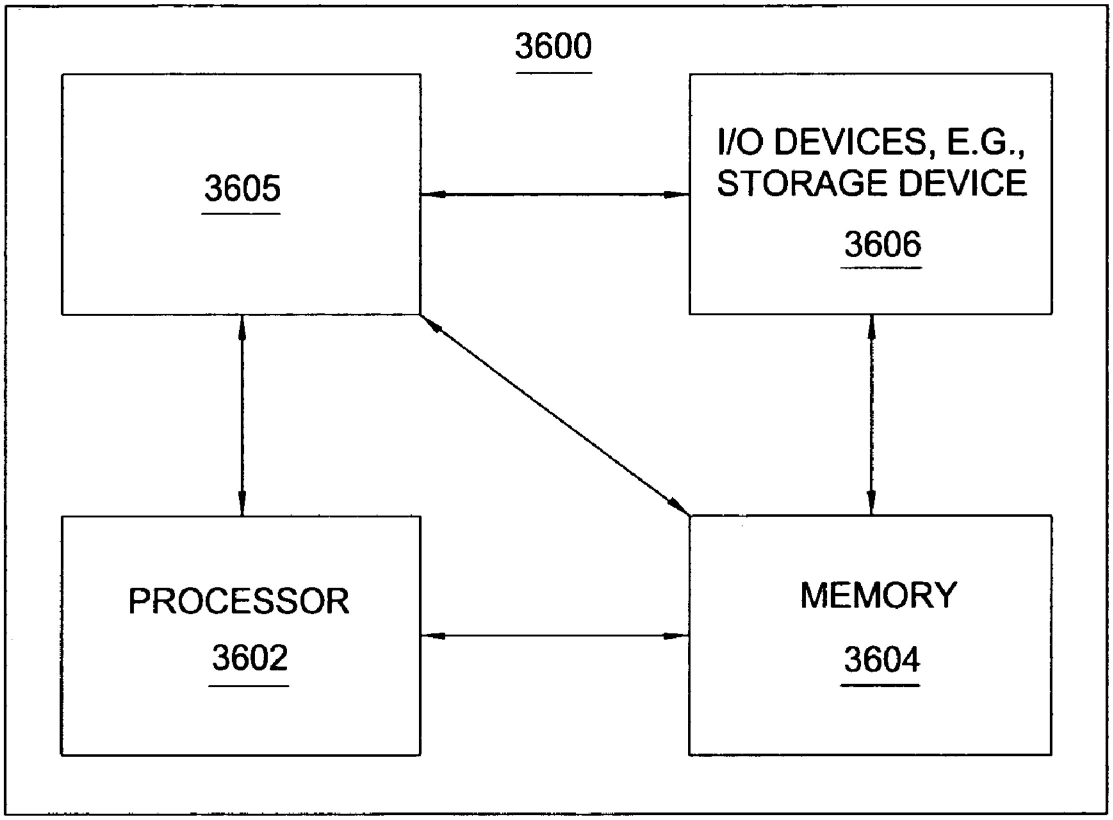
FIG. 36 is a high level block diagram of a general-purpose computer suitable for use in performing the functions described herein.

FIG. 36 is a high level block diagram of a general purpose computer suitable for use in performing the functions described herein. In FIG. 36, the system 3600 comprises a processor element 3602 (e.g., a CPU), a memory 3604, e.g., random access memory (RAM) and/or read only memory (ROM), an exemplary embodiment of the method for designing a colorimeter having integral CIE color-matching filters, including determining optimal colorant thicknesses 3605, and various input/output devices 3606 (e.g., storage devices, including but not limited to, a tape drive, a floppy drive, a hard disk drive or a compact disk drive, a receiver, a transmitter, a speaker, a display, a speech synthesizer, an output port, and a user input device, such as a keyboard, a keypad, a mouse, and the like).

Exemplary embodiments of the present invention can be implemented in software and/or in a combination of software, firmware, and/or hardware, e.g., using application specific integrated circuits (ASIC), a general purpose computer or any other hardware equivalents. In one embodiment, the method 3605 can be loaded into memory 3604 and executed by processor 3602 to implement the functions as discussed above. As such, the method 3605 (including associated data structures) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

What is claimed is:

1. A method for determining a design of a color-measuring device, comprising:

determining a plurality of light detectors; and determining a plurality of filters having a plurality of colorants that are permanently deposited onto the plurality of light detectors;

wherein the plurality of colorants permits reflected light to pass through the plurality of filters to cause the plurality of light detectors to produce an output approximating a plurality of spectral responses of at least one Commission internationale de l'éclairage (CIE)-like color-matching function weighted by a reference illuminant spectrum.

2. The method of claim 1, wherein the color-measuring device is a solid-state device.

3. The method of claim 1, wherein each filter in the plurality of filters has at least one layer, and further comprising:

determining a thickness of each of the at least one layer.

4. The method of claim 1, further comprising:

determining a set of combinations of the plurality of colorants weighted by a colorimeter illuminant spectrum, each combination in the set of combinations being determined so that the output has the plurality of spectral responses approximating the CIE-like color-matching function weighted by the reference illuminant spectrum.

5. The method of claim 4, further comprising:

selecting one combination in the set of combinations having a best solution and meeting predetermined performance criteria, the one combination being permanently deposited onto the color-measuring device.

6. A method for designing a colorimeter having integral illuminant-weighted Commission internationale de l'éclairage (CIE)-like color-matching filters, comprising:

determining a set of channels from a plurality of channels;

determining a set of filters, each filter in the set of filters being permanently deposited on each channel in the set of channels, each filter in the set of filters being an absorptive filter, each filter in the set of filters having at least one layer, at least one channel in the set of channels having at least one filter with a double layer so that a linear combination of the set of channels weighted by a colorimeter illuminant spectrum matches a set of CIE-like target color-matching functions weighted by a reference illuminant spectrum within a tolerance, each channel in the set of channels integrating at least one detector and at least one filter in the set of filters onto a single semiconductor substrate;

determining a colorant for each layer on each channel in the set of channels from a set of colorants; and determining a thickness of each layer on each channel in the set of channels.

7. The method of claim 6, further comprising:

determining the linear combination of the set of channels weighted by the colorimeter illuminant spectrum to approximate each CIE-like target color-matching function in the set of CIE-like target color-matching functions weighted by the reference illuminant spectrum.

8. The method of claim 6, wherein each channel in the set of channels is substantially identical prior to attachment of the set of filters.

9. The method of claim 6, wherein selection of the colorant for each channel in the set of channels and a colorant thickness for each layer on each channel in the set of channels is performed by:

generating a set of potential solutions, the set of potential solutions including a set of colorants to be apportioned in colorant layers to comprise a filter for each channel in the set of channels, a particular number of colorant layers for each filter, and a thickness of each colorant layer for each channel in the set of channels.

10. The method of claim 9, further comprising:

selecting a solution from the set of potential solutions by minimizing a number of channels in the set of channels needed to match the CIE-like target color-matching functions within the tolerance, by minimizing a number of colorant layers per channel in the set of channels without increasing the number of channels in the set of channels needed to match the CIE-like target color-matching functions weighted by the reference illuminant spectrum within the tolerance, and by minimizing deviations in performance under the influence of colorant layer thickness variations; and providing the solution, the solution including the set of channels, the colorant for each layer of each channel in the set of channels, and the thickness of each layer needed to match the CIE-like target color-matching functions weighted by the reference illuminant spectrum within the tolerance.

11. The method of claim 10, wherein selecting the solution further comprises:

optimizing colorant selection and layer thicknesses for a best match to the CIE-like target color-matching functions weighted by the reference illuminant spectrum; and optimizing channel coefficients for the best match to the CIE-like target color-matching functions weighted by the reference illuminant spectrum.

12. The method of claim 10, wherein selecting the solution further comprises:

testing the set of potential solutions for layer thickness variation;

sorting the set of potential solutions by a figure of merit value;

selecting a solution from the set of potential solutions by configuration type and layer structure.

13. The method of claim 10, wherein matching the CIE-like target color-matching functions weighted by the reference illuminant spectrum within the tolerance includes computing an error measure for a test reflectance spectra.

14. The method of claim 10, further comprising: comparing and storing results for set of the potential solutions.

15. The method of claim 10, further comprising:

providing a plot of the solution and the target color-matching functions weighted by the reference illuminant spectrum.

16. The method of claim 10, further comprising:

providing quantitative color differences between the solution and the target color-matching functions weighted by the reference illuminant spectrum.

17. A method for designing a colorimeter having integral illuminant-weighted Commission internationale de l'éclairage (CIE) color-matching filters, comprising:

receiving a plurality of colorants and a plurality of target CIE-like color-matching functions;

determining a plurality of channel colorant recipes and a plurality of additive mixtures of channels weighted by a colorimeter illuminant spectrum to match the plurality of target CIE-like functions weighted by a reference illuminant spectrum within a tolerance for a minimum number of channels and colorants per channel, each channel being one of a plurality of channels in a colorimeter, each channel having a filter covering each detector; and providing a best solution from the plurality of channel colorant recipes and the plurality of additive mixtures of channels, the best solution including a set of channels, a thickness for each colorant in each channel, and a matrix of linear coefficients.

18. The method of claim 17, further comprising: generating a plurality of combinations of the plurality of channel colorant recipes and the plurality of additive mixtures of channels;

finding a plurality of potential solutions by optimizing the thickness for each colorant in each channel and to approximate the target CIE-like color-matching functions weighted by the reference illuminant spectrum; and selecting the best solution from the plurality of potential solutions.

19. The method of claim 17, further comprising:

receiving a plurality of colorant spectra, a detector response spectrum, an optics transmission spectrum, and a reference illuminant spectrum.

20. The method of claim 17, further comprising:

receiving a plurality of reference reflectance spectra.

21. The method of claim 17, wherein the filter is absorptive and the best solution includes at least one double layer.

22. A semiconductor substrate according to the method of claim 17, the semiconductor substrate having deposited thereon the plurality of channels, each channel in the plurality of channels integrating at least one detector and at least one filter, according to the best solution.

23. A computer-readable medium having stored thereon a plurality of instructions, the plurality of instructions including instructions which, when executed by a processor, cause the processor to perform the steps of a method for designing a colorimeter having integral Commission internationale de l'éclairage (CIE) color-matching filters, comprising:

determining a plurality of light detectors; and determining a plurality of filters having a plurality of colorants that are permanently deposited onto the plurality of light detectors;

wherein the plurality of colorants permit reflected light to pass through the plurality of filters to cause the plurality of light detectors to produce an output approximating a plurality of spectral responses of at least one CIE-like color-matching function weighted by a reference illuminant spectrum.

* * * * *